US006297853B1

(12) United States Patent
Sharir et al.

(10) Patent No.: US 6,297,853 B1
(45) Date of Patent: Oct. 2, 2001

(54) APPARATUS AND METHOD FOR DETECTING, IDENTIFYING AND INCORPORATING ADVERTISEMENTS IN A VIDEO IMAGE

(75) Inventors: Avi Sharir, Ramat Hasharon; Michael Tamir, Tel Aviv, both of (IL)

(73) Assignee: Orad Hi-Tech Systems Ltd., Forest Hills, NY (US)

(*) Notice: Subject to any disclaimer, the term of this patent is extended or adjusted under 35 U.S.C. 154(b) by 0 days.

(21) Appl. No.: 09/133,129

(22) Filed: Aug. 12, 1998

Related U.S. Application Data

(62) Division of application No. 08/501,088, filed on Oct. 25, 1995, now Pat. No. 5,903,317.

(30) Foreign Application Priority Data

Feb. 14, 1993 (IL) ........................................ 104725
Oct. 12, 1993 (IL) ........................................ 107266

(51) Int. Cl.[7] .................................................. H04N 9/74
(52) U.S. Cl. .................... 348/589; 348/157; 348/159; 348/153; 348/161; 348/907; 725/22; 725/1
(58) Field of Search .................................. 348/150, 153, 348/154, 155, 157, 159, 161, 135, 137, 138, 139, 907, 589; 382/103, 106, 107, 170; 725/32, 36, 8, 1, 22

(56) References Cited

U.S. PATENT DOCUMENTS

| 3,635,085 | * | 1/1972 | Shimotsuma et al. ............... 348/164 |
| 3,848,082 | * | 11/1974 | Summers ............................. 348/907 |
| 3,883,684 | * | 5/1975 | Ikegami et al. ..................... 348/157 |
| 3,936,800 | * | 2/1976 | Ejiri et al. .......................... 382/205 |
| 4,044,377 | * | 8/1977 | Bowerman ........................... 348/136 |
| 4,112,463 | * | 9/1978 | Kamin .................................. 348/154 |
| 4,555,726 |   | 11/1985 | Teeter ..................................... 358/93 |
| 4,601,053 | * | 7/1986 | Grumet ................................. 382/106 |
| 4,667,221 |   | 5/1987 | Cawly et al. .......................... 358/22 |
| 4,806,924 |   | 2/1989 | Girard et al. ......................... 340/706 |
| 4,814,883 |   | 3/1989 | Perine et al. ......................... 358/181 |
| 4,817,175 |   | 3/1989 | Tenenbaum et al. ................. 382/41 |
| 4,884,131 |   | 11/1989 | Chevion et al. ..................... 348/384 |
| 4,907,086 |   | 3/1990 | Truong ................................. 358/183 |
| 4,947,256 |   | 8/1990 | Wood et al. ......................... 358/183 |
| 4,992,866 |   | 2/1991 | Morgan ................................ 358/108 |
| 5,018,215 |   | 5/1991 | Nasr et al. ............................ 382/15 |
| 5,021,887 |   | 6/1991 | Park ..................................... 358/183 |
| 5,029,014 |   | 7/1991 | Lindstrom ............................ 358/342 |
| 5,046,165 |   | 9/1991 | Pearman et al. ..................... 358/183 |
| 5,099,331 |   | 3/1992 | Truong ................................. 358/183 |

(List continued on next page.)

FOREIGN PATENT DOCUMENTS 9306691    4/1993   (WO) .

OTHER PUBLICATIONS

Canny, J., A Computational Approach to Edge Detection, *IEEE Transactions on Pattern Analysis and Machine Intelligence*, vol. PAMI–8, No. 6, Nov. 1986, pp. 679–698.

Primary Examiner—Reinhard J. Eisenzopf
Assistant Examiner—Linus H. Lo
(74) Attorney, Agent, or Firm—Ladas & Parry

(57) ABSTRACT

A system (FIGS. 7 and 8) and method (FIG. 1) for video transmission of active events, for example sports events, having in the background physical images in designated targets, wherein the physical images are electronically exchanged with preselected virtual images, so that objects or shadows actually blocking the same portions of the virtual images, and the motion of players or a ball blocking the physical image will block corresponding regions of the exchanged virtual image, so that the exchanged electronic image will remain in the background of the event, exactly as the original image.

5 Claims, 19 Drawing Sheets

U.S. PATENT DOCUMENTS

| | | | | |
|---|---|---|---|---|
| 5,151,788 | * | 9/1992 | Blum | 348/907 |
| 5,231,494 | | 7/1993 | Wachob | 348/385 |
| 5,233,423 | | 8/1993 | Jernigan et al. | 358/181 |
| 5,243,418 | * | 9/1993 | Kuno et al. | 348/155 |
| 5,258,843 | | 11/1993 | Truong | 358/183 |
| 5,264,933 | * | 11/1993 | Rosser et al. | 348/578 |
| 5,285,273 | * | 2/1994 | James et al. | 348/169 |
| 5,301,240 | | 4/1994 | Stockum et al. | 382/1 |
| 5,313,302 | | 5/1994 | Ohta et al. | 348/586 |
| 5,335,014 | | 8/1994 | Elberbaum | 348/159 |
| 5,353,392 | | 10/1994 | Luquet et al. | 348/578 |
| 5,355,161 | * | 10/1994 | Bird et al. | 348/907 |
| 5,367,329 | * | 11/1994 | Nakagaki et al. | 725/8 |
| 5,436,653 | * | 7/1995 | Ellis et al. | 348/2 |
| 5,436,672 | * | 7/1995 | Medioni et al. | 348/591 |
| 5,491,517 | * | 2/1996 | Kreitman et al. | 348/581 |
| 5,521,634 | | 5/1996 | McGary | 348/153 |
| 5,543,856 | * | 8/1996 | Rosser et al. | 348/578 |
| 5,566,251 | * | 10/1996 | Hanna et al. | 382/284 |
| 5,598,208 | | 1/1997 | McClintoch | 348/159 |
| 5,600,366 | * | 2/1997 | Schulman | 725/36 |
| 5,892,554 | * | 4/1999 | Dicicco et al. | 348/584 |
| 5,917,553 | * | 6/1999 | Honey et al. | 348/578 |

* cited by examiner

APPARATUS AND METHOD FOR DETECTING, IDENTIFYING AND INCORPORATING ADVERTISEMENTS IN A VIDEO IMAGE

This is a divisional of application Ser. No. 08/501,088 filed on Oct. 25, 1995 (now U.S. Pat. No. 5,903,317 of May 11, 1999) which is PCT/US91/01679 filed Feb. 14, 1994 and which designated the U.S., claims the benefit thereof and incorporates the same by reference.

The present invention relates to apparatus and methods for superimposing a small video image into a larger video image.

International sports events or other spectacles generally draw the interest and attention of spectators in many countries. For example, the Olympics, Superbowl, World Cup, major basketball and soccer games, auto races etc. fit into this category. Such events are generally broadcast live by video to a large international audience. The locale in which these events take place, such as stadiums or courts, provide advertising space all around in the form of signs, posters or other displays on fences and billboards, and in fact on any unoccupied space suitably located, including sections of the playing field.

Due to the nature of the displays, which are mostly in the form of printed matter, they are not changed too frequently and remain at least for a day, or a series or a whole season, and are directed mostly at local audiences. In cases where two teams from different countries play each other, the advertisements are usually arranged so that one side of the stadium contains advertisements directed to audiences in one country, while the other side has advertisements directed to the spectators in the other country.

The video cameras in these instances film the event from opposite sides of the stadium for their respective audiences. This of course is logistically complicated and limits the angle from which the events can be seen in either of the countries represented in the game.

Another limitation to present methods of advertising is the stringent safety requirements for positioning the billboards, so as not to interfere with the game, nor disturb the view of the spectators in the stadium, nor pose a danger to the players. The displays must not be too close to the actual field of action, so as not to distract the players.

A most serious drawback of the present system for advertising at major world sports events is the fact that although the event is televised live throughout the world, the actual physical advertisements in the stadium, because of their broad international exposure, can only cater to products having a world market.

Local advertisers can only make use of such world-class televised events by locally superimposing messages on the TV screen, or by interrupting the real time of the event.

Another drawback of the existing system is that over long time periods, due to the scanning of the TV camera, the signs appear too blurred to be read by the TV viewers. On many other, occasions, only part of the sign is visible to the TV viewers and the sign cannot be read.

The following reference, the disclosure of which is incorporated herein by reference, describes Gaussian edge detection:

J. F. Canny, "A computational approach to edge detection", IEEE Trans. Pattern Analysis and Machine Intelligence, Vol. 8, pp. 679–698, November, 1986.

The present invention relates to a system and method for detecting, identifying and scaling in a video frame, suitable distinct targets and areas and inserting into these areas virtual images stored in the memory of the system, so that all objects or shadows in front of the distinct areas blocking portions thereof from view will be seen in a video transmission as being in front of and blocking the same portions of the areas containing virtual images.

A particular feature of the invention is to operate the system in real time. The invention also provides apparatus for operating the system. The invention is particularly useful for advertising in sports courts.

It is an object of the present invention to provide a system and method for video transmission of active events, for example sports events, having in the background physical images in designated targets, wherein the physical images are electronically exchanged with preselected virtual images, so that objects or shadows actually blocking portions of the physical images will be seen by viewers as blocking the same portions of the virtual images, and the motion of players or a ball blocking the physical image will block corresponding regions of the exchanged virtual image, so that the exchanged electronic image will remain in the background of the event, exactly as the original image.

In a preferred embodiment of the present invention, the physical image to be substituted is detected, recognized, and located automatically and is replaced within one TV frame so that the original image is not perceptible to the TV viewers. In this embodiment no man is required in the loop during line broadcasting.

Since the same physical image may be captured by a plurality of TV cameras deployed in various locations around the court, and each camera usually has a continuous zoom lens, the system is able to detect and identify a certain physical target in all possible spatial orientations and magnifications of the target.

The system is also capable of unequivocally identifying the scale and perspective of the physical target and normalizing the implanted virtual image into the same perspective.

Another object of the invention is to provide a system and method of implanting in video transmission, virtual images in predetermined "free" background areas generally unsuitable for displaying physical signs, like he sports court itself.

In a preferred embodiment of the present invention, the task of detection and identification of these free ares is executed automatically.

A further object of the present invention is to automatically identify cases in which the physical billboard appears blurred due to camera scanning or jitter and to replace the blurred sign with a clearer one or to alternatively apply the same blurring degree to the replacing sign so that it will have an appearance similar to its neighboring signs.

Yet another object of the present invention is to automatically identify a case in which only a small portion of the billboard is visible in the camera's field of view and to replace this small portion with the whole image of the original billboard.

Still another object of the invention is to automatically identify cases in which the resolution of the captured billboard image is not sufficient for the TV viewers and to electronically replace them with larger virtual billboards so that their message may be conveniently captured by the viewers.

Another object of the invention is to perform the implantation described above on a succession of video frames.

Yet another object of the invention is to provide the above system and method for electronic exchange or planting of virtual images in real time.

A further object of the invention is to provide a system and method for video broadcasting the same event to different populations of viewers in real time, with different electronic messages substituted in the spaces occupied by physical displays.

Still another object of the invention is to provide a system and method for utilization of available space in a stadium unused by physical displays for the purpose of advertising by planting therein electronic virtual images during real time broadcasting of an event taking place in a stadium.

Still a further object of the invention is to provide apparatus for use in video transmission for exchanging physical images with virtual images or planting virtual images in unused background areas during an event in real time video transmission, without disturbing the actual transmission of the event.

In accordance with a preferred embodiment of the present invention, there is provided a system and method for broadcasting active events being captured by a TV camera, wherein virtual images are electronically substituted in or superimposed on targets selected from physical displays and preselected background regions, including an electronic data bank of event locales and targets therein, a memory unit for storing digitized virtual images for substitution in the targets, apparatus for grabbing and digitizing video frames, apparatus for automatic target searching in digitized video frames and for detecting targets therein, apparatus for localization, verifying and identifying the targets, apparatus for comparing the detected targets with corresponding targets in the data bank, apparatus for scaling and identifying the perspective of the original target and transforming the virtual substitute image into the same scale and perspective, apparatus for real-time video tracking of a detected target throughout a succession of frames, and for the identification of target magnification (zoom) or changes in perspective, apparatus for distinguishing between non-background objects and shadows that block portions of the detected targets, apparatus for electronically transferring the objects and shadows from the original video frame to the substituted frame, apparatus for inserting the electronically transformed virtual image into the video frame substituting the original image in the target without this transformation being perceptible by the viewers, apparatus for receiving and storing virtual images and generating a virtual images data bank, apparatus for generating a locale data bank either prior or during an event (a learning system) and video signal input-output apparatus.

For this purpose the system uses a special method for the automatic detection and identification of targets using one or more of the following attributes:

geometry—such as the physical configuration of billboards (rectangular shape or parallel lines attribute) as seen from different angles and magnifications, texture of slogans and graphics—such as for example in posters, character recognition, field or court lines—which serve as references for designating free court areas, standard objects that have typical shape and texture— such as post, backboard, basket and/or a player's shirt, colour, and objects and shadows temporarily blocking portions of the image intended to be exchanged.

The method clearly identifies the subject target at any capturing angle and range and in any zoom state, and preferably in real time, so that the original billboard will not be perceptible to the TV viewers. The method typically identifies, in any frame, a relatively large number of targets (up to 20 targets or more in an extreme case).

Blocking objects and shadows are distinguished from the background image by means of:

comparing the detected target (partially blocked) with the same target stored in the system's data bank. The smooth and processed difference image between the two is the image of hidden surfaces which forms a part of the blocking object. This procedure may be implemented also by using correlation windows and identifying a low value of the correlation coefficient as being due to occlusion, motion detection—to identify objects that move with respect to the background, texture and geometric shape—distinguishing a player, ball or shadow from a sign, slogan or graphic image etc., and colour—and shades of colour.

The electronic exchange is preferably instant and unnoticeable by the viewer since a perceptible exchange is usually unaccepted by the TV networks. Alternatively, it is possible to continuously "fade" the original image while enhancing the virtual image.

False identification of targets and images is preferably avoided.

The substituted target should be localized to sub-pixel accuracy so that the replacing target be spatially fixed with respect to the frame during the whole succession of TV frames in which the target is inside the camera's field of view. This accuracy is due to the fact that the human eye is sensitive to sub-pixel motions.

The methods preferably employ special parallel and pipelined processing hardware which will allow carrying out simultaneously the large number of operations involved in this process.

The method of this invention preferably uses two optional sub-systems:

a) Digital Image Converter and Storage Unit—consisting of an electro-optical scanner for digital conversion and storage of virtual images, for constructing a memory unit for images such as advertisements. The system may also have the possibility of inputting images such as advertisements in other ways, as by digital interface (magnetic, optical disc, communication link) or video port, and may further include a graphics programme and man-machine interface for designing virtual images (like slogans) "on-the-spot".

b) Locale "learning" and storage system—for creating a data bank of targets and fixed objects in locales such as stadiums and fields, including: signs (location, shape, colour and type—one-time, seasonal, etc.), court markers (lines, colour, goal/basket, post), etc.

These two sub-systems can operate off-line or can be part of the basic system. The system can "learn" the details of the court in the course of a live event and create/update its data bank for future use. This can also be done using the trial shots taken before the event starts.

The method involves the following steps:

When the live or previously recorded video film is being transmitted, the following steps take place:

1) Frame grabbing and digitization—each video frame is grabbed and each pixel value is digitized and stored in system memory, 2) Searching—the captured video frame is scanned to detect either actual physical displays (like the icons stored in the memory) or background regions suitable for implantation whose specifications have been predefined. After detection, suspected targets, i.e. displays, are checked for unequivocal identification. This is accomplished by identification of messages and graphics in the displays, or of colour and texture attributes using standard pattern recognition techniques like edge correlation and region matching methods, character recognition, neutral network techniques and so on. After the target (display) has been identified and accurately localized, its optical magnification and perspective are computed and the locations of all other stored targets (displays) in the frame are consecutively predicted using the locale's lay-out in the data bank, giving the system positive search clues for additional targets in the same video frame.

3) Blocked surface identification—when a given message area or display region is positively identified in a frame, the target (display) is compared with its properly scaled stored image (icon) and those areas of the display that are temporarily blocked by an object such as by the body of a player, by a ball or a shadow etc. are revealed after proper smoothing and processing of the results. The pixel addresses of these surfaces are stored so that these surfaces will later be superimposed on the substituted image.

4) Scaling, perspective transformation and substitution—when a physical image display or a free location is identified and localized, the memory of the system is searched to find the desired virtual image to be substituted or implanted. The exchanged virtual image (patch) is then first normalized to acquire the proper size and perspective of the original physical image and identified blocked surfaces are then removed, so that the exchanged image looks like a background display or as a painted display on the court.

5) Real-time video tracking—typically a given display is visible for a few second before it moves out of the camera's field of view. The system preferably uses previous frames' information to track a given display throughout this succession of frames. To do that, conventional video tracking techniques, such as edge, centroid or correlation tracking methods, are executed. These methods should incorporate subpixel accuracy estimates. Tracking of players or of the ball can also be instrumental to identify blocking portions in the case where target icons are not stored in the system memory or for implantation in free regions.

There is thus provided, in accordance with a preferred embodiment of the present invention, apparatus for advertisement incorporation including a field grabber operative to grab and digitize at least one field representing at least a portion of a sports facility, and an advertisement incorporator operative to incorporate, into at least one field, an advertisement whose contents varies over time.

Further in accordance with a preferred embodiment of the present invention, the advertisement incorporator includes an advertisement site detector operative to detect at least one advertisement site in at least one field on a basis other than location of the advertisement site relative to the sports facility.

Still further in accordance with a preferred embodiment of the present invention, the advertisement incorporator is operative to incorporate an advertisement into at least one field at a partially occluded advertisement site within the sports facility.

Still further in accordance with a preferred embodiment of the present invention, the contents of the advertisement varies in accordance with a predetermined schedule.

Additionally in accordance with a preferred embodiment of the present invention, the contents of the advertisement varies in accordance with an external input.

Further in accordance with a preferred embodiment of the present invention, the advertisement incorporator also includes an audience noise evaluator operative to detect and evaluate a level of noise generated by an audience and to provide a noise level input to the advertisement incorporator and wherein the contents of the advertisement varies in accordance with the noise level input.

There is additionally provided, in accordance with a preferred embodiment of the present invention, a method for advertisement incorporation including grabbing and digitizing at least one field representing at least a portion of a sports facility, and incorporating into at least one field, an advertisement whose contents varies over time.

The present invention will be understood and appreciated more fully from the following detailed description, taken in conjunction with the drawings and appendices in which.

Figure 1:
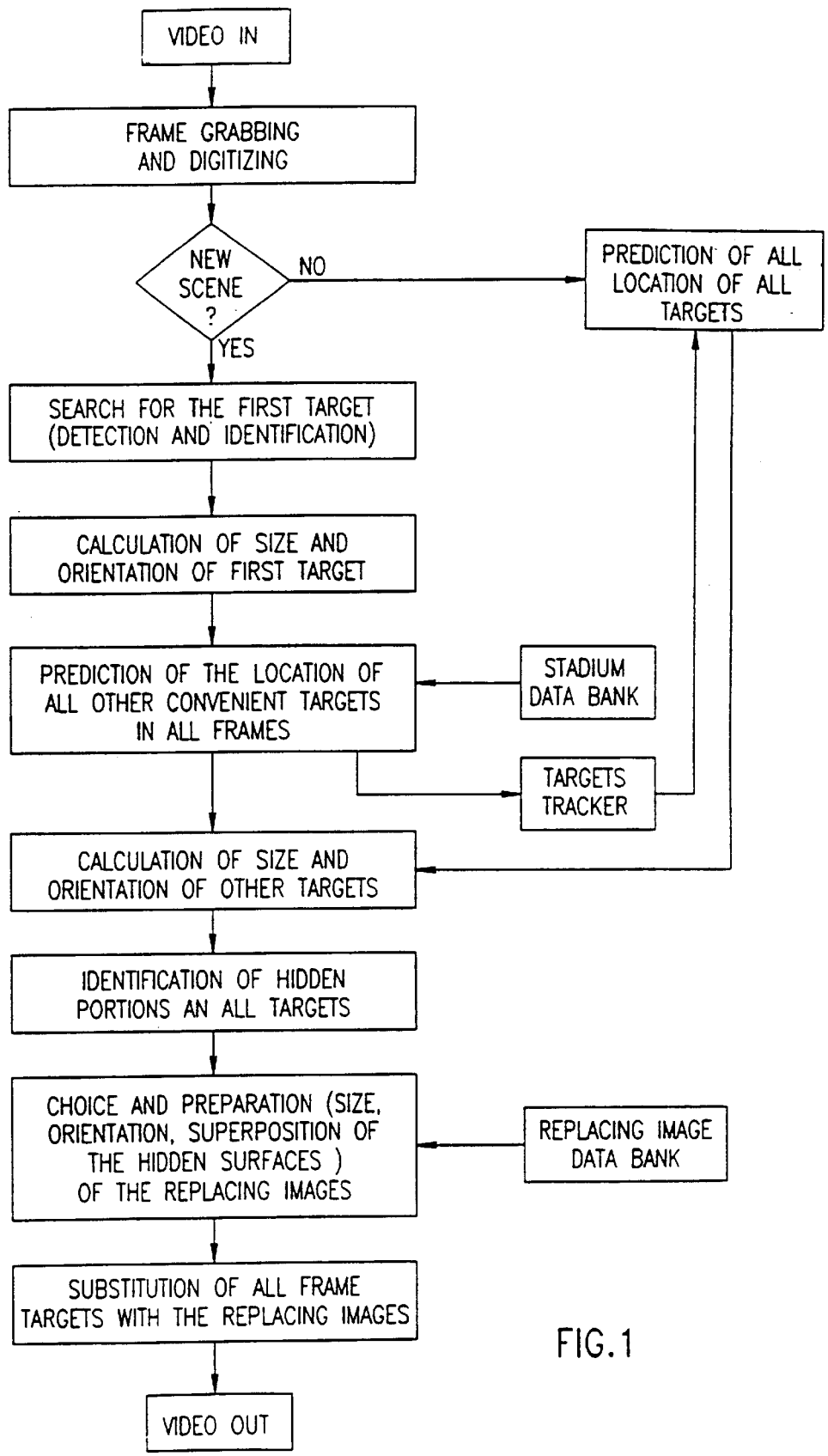
FIG. 1 is a logical flow diagram of the processes and tasks required in accordance with a preferred embodiment of the method of the present invention.

Referring now to FIG. 1, in a preferred embodiment of the present invention, the system and method are designed to automatically perform the substitution of physical targets with synthetic images in real time, although a simpler version of the invention can be used off-line.

Figure 2:
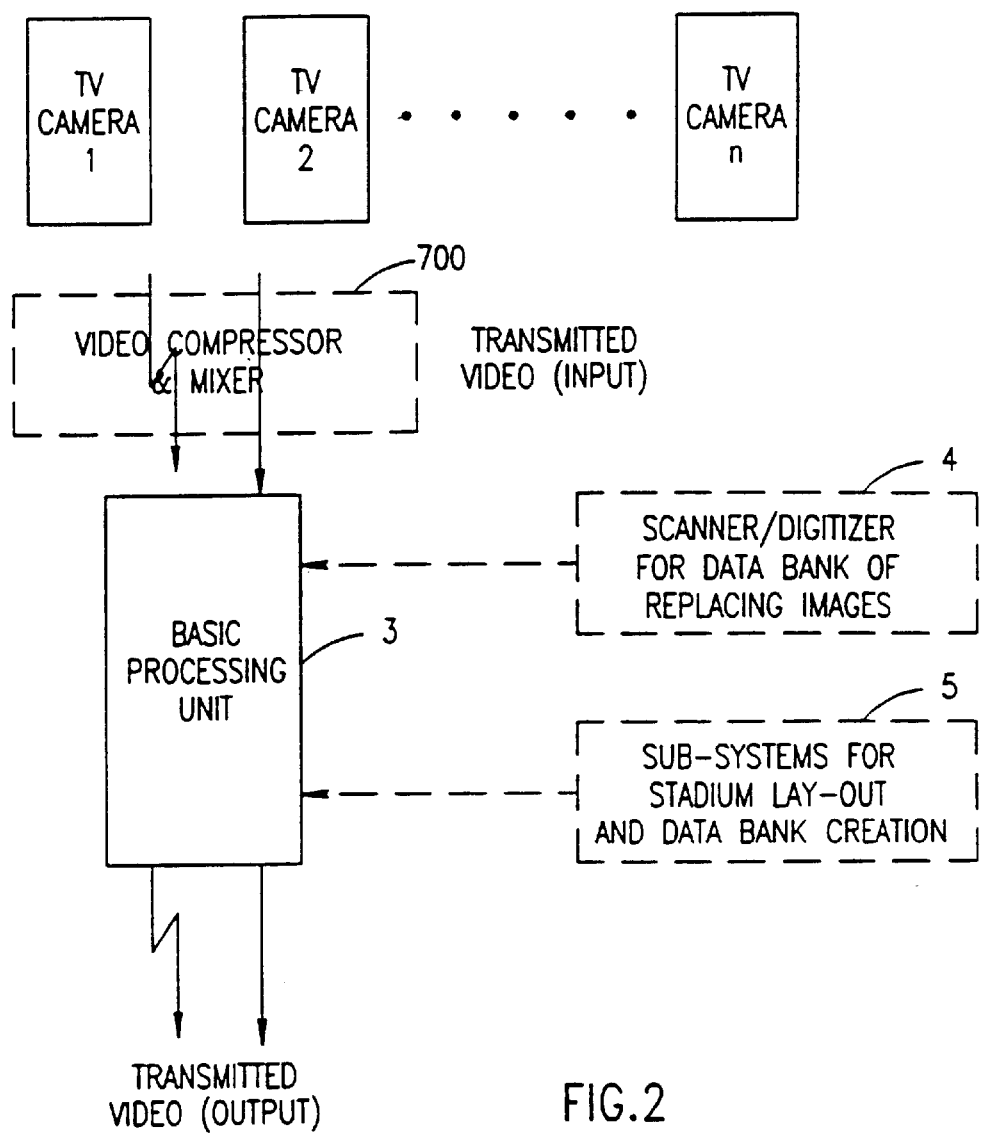
FIG. 2 is a block diagram of the basic and sub-system modules in accordance with a preferred embodiment of the present invention.

When operating the system, the modules required are illustrated in the block diagram of FIG. 2. These include:

a basic processing unit;

an optional scanner/digitizer used to create the data bank of synthetic images from still pictures; and an optional sub-system composed of a TV camera, digitizer and memory to create the stadium data bank. As was mentioned before, there may be other methods to create the data bank of synthetic images. The locale's (stadium's) data bank may also be created from the trial shots taken before the game starts or even be incrementally built in the course of the game by means of a "learning" process or by using data supplied by the stadium owner, the advertiser or the TV network.

Figure 3:
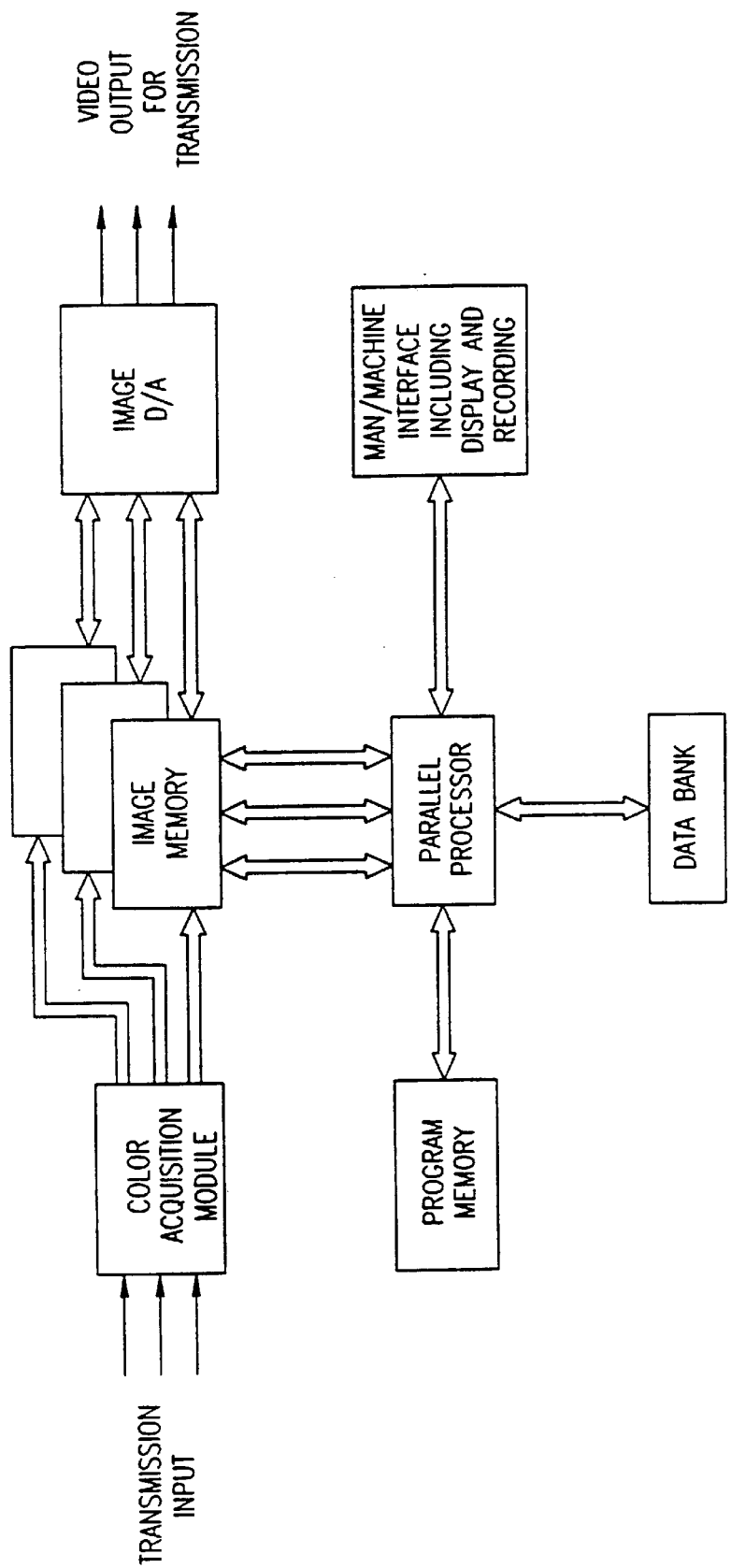
FIG. 3 is a block diagram of a basic processing unit.

FIG. 2 illustrates a block diagram of the apparatus used in the system, wherein 1, 2, ... n are a plurality of TV cameras in different positions, which are the usual TV network cameras, 3 is the basic processing unit described in FIG. 3, sub-system 4 converts and stores synthetic images and sub-system 5 is a "learning" and storage system for event locales and targets therein. The output 6 can be transmitted by cable, optical fiber or wirelessly. It can also be displayed and/or recorded.

The basic processing unit required to operate the system in real-time is shown in FIG. 3. This module comprises:

a frame grabber for colour image acquisition;

a plurality of image memories;

a fast parallel processor;

a program memory;

data banks of synthetic images to be substituted and of locale's lay-outs and target icons;

a man/machine interface for control and for local display and recording; and an image digital to analog converter.

The above apparatus is used to automatically locate in real time in each video frame, suitable areas within a stadium which have physical displays or might be suitable for embodying such displays, and to substitute for such physical displays, or introduce into such areas, virtual images which are stored in the memory of the system to serve as advertisements in the background.

These electronic inserted images will be seen by viewers as if they are physical displays located in a stadium and all action taking place in front of the actual physical display will appear to the viewer to be taking place in front of the virtual image as well.

Figure 4:
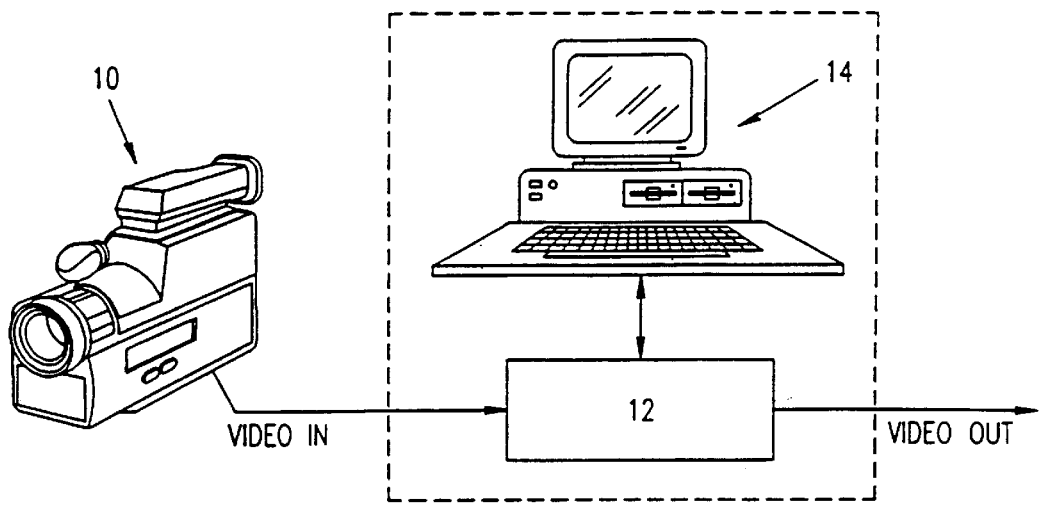
FIG. 4 illustrates a minimum basic on-line system in accordance with a preferred embodiment of the present invention.

FIG. 4 illustrates an on-line system in accordance with an aspect of this invention consisting of a video camera 10, video processing unit 12 and work station 14 that provides the required man/machine interface.

Figure 5:
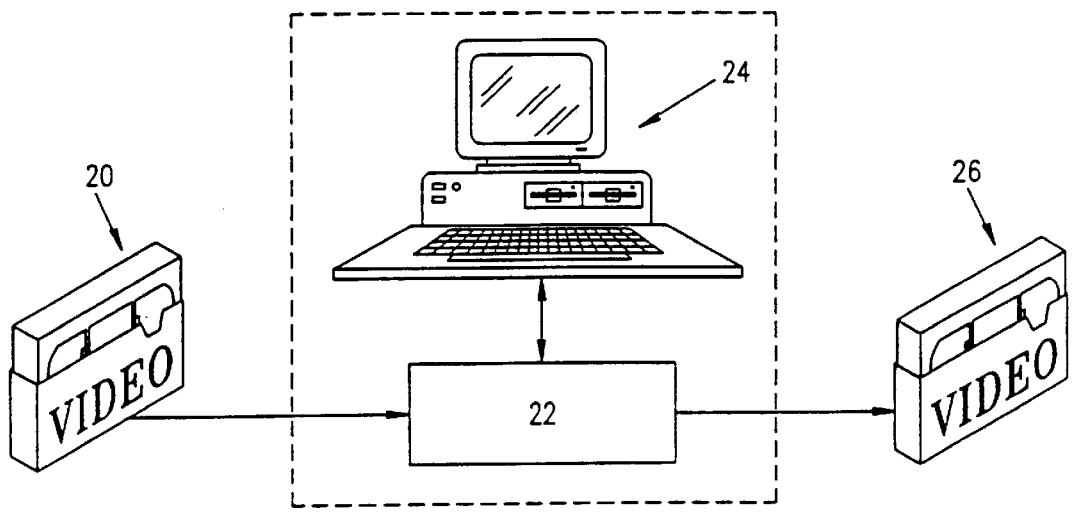
FIG. 5 illustrates a minimum basic off-line system in accordance with the invention.

FIG. 5 illustrates a basic off-line system in accordance with one aspect of this invention. In this case, a video tape 20, a video cassette recorder or a video disk is the input rather than a TV camera and this is processed by the processing unit 22 and work station 24 to provide a video tape output 26 with substituted images.

Figure 6:
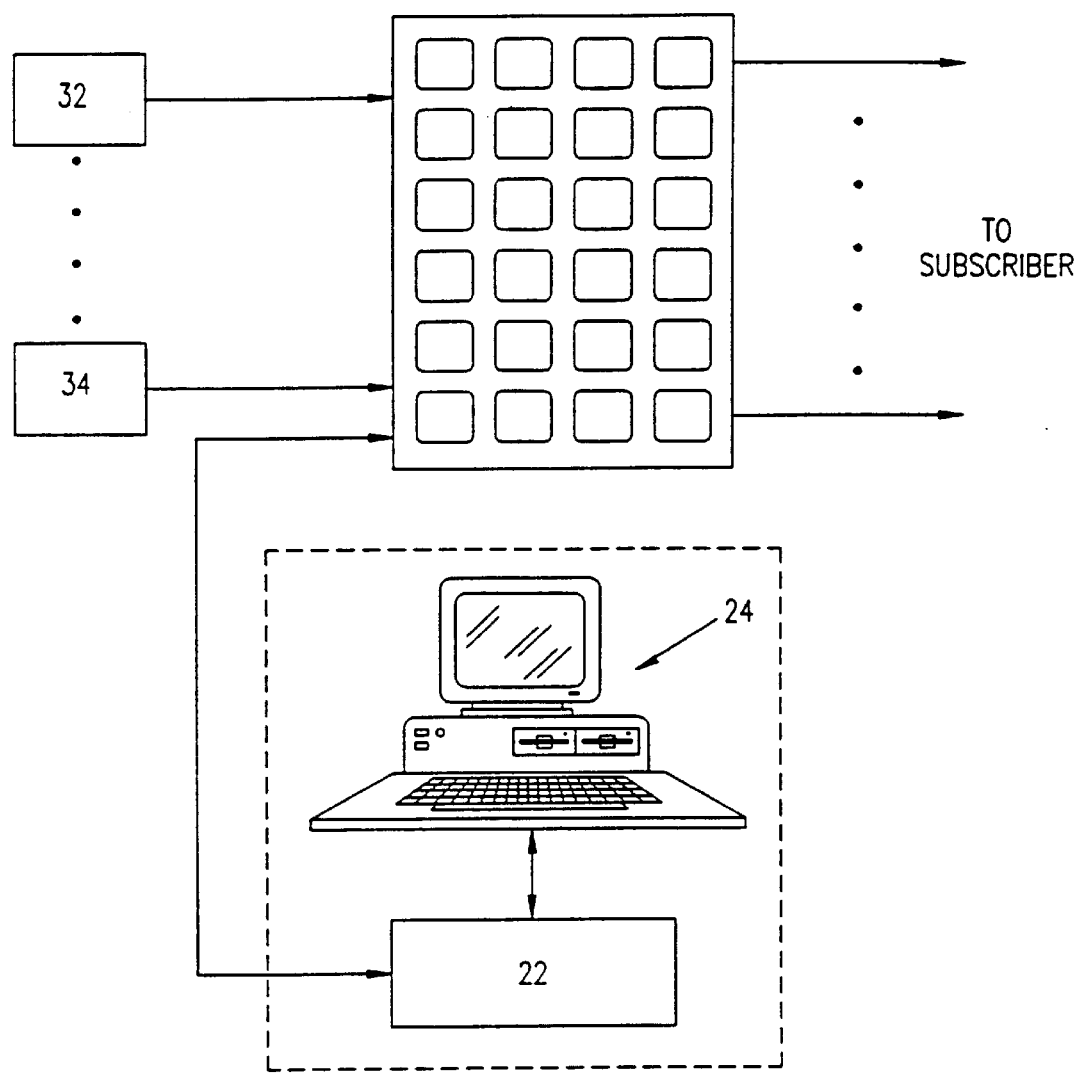
FIG. 6 illustrates a system in accordance with a preferred embodiment of the present invention adapted for cable TV application.

FIG. 6 illustrates yet another application of the system of this invention, namely a cable TV center. The center 30 receives transmissions from stations 32 and 34. These transmissions are processed by the processing unit 22 and work station 24 and broadcast with substituted advertisements to subscribers from the center 30.

Although a preferred system according to this invention superimposes blocking objects and shadows on the virtual images, a less sophisticated and much cheaper system is also intended as part of this invention, and that is a system where virtual images are exchanged for physical without relating to blocking objects.

Such a system can be quite useful for substituting images in unblocked regions, for example high up in a stadium.

Although a preferred embodiment of the present invention automatically detects and recognizes a given billboard in each TV frame, a less sophisticated system is also intended as part of this invention. In such a less sophisticated system the selection of a given sign to be substituted is done "manually" by a pointer such as a light pen or a cursor (operated by a mouse) with a human operator in the loop.

This system is mainly off-line. When it is used on-line in real time it will be very difficult for the operator to perform the pointing task since in a typical scenario the sign is cntinuously visible for only short periods of a few seconds each.

In such a mode of operation the replacement will nevertheless be perceptible to the TV viewers. This annoys the spectators and in many cases is not permitted by the TV networks.

From the above description of the invention, it is apparent that the system, method and apparatus described above can have many applications. Thus, it is also possible to introduce virtual images, such as slogans or graphic advertisement, on the uniforms of players, particularly when a player is shown in close-up. In such a case, the outline of the player, or at least his shirt or helmet, would be the target for implanting a virtual image.

Another possible application is the automatic generation of continuous video films showing only sequences wherein specific targets, which have been pre-selected, appear to the exclusion of sequences where these targets do not appear. Such video films can be useful for analyzing and monitoring the activity of specific targets, for example individual players and their performance throughout an entire team game. This enables tracking each individual throughout an entire game without having to replay the entire cassette for each player.

Another application of this invention is to generate statistical data of targets such as advertisements, for example the number of times and accumulated period that an advertisement appears on the screen, and to debit acccordingly.

The implanted image can be in the form of a fixed, blinking or scrolling image, or it may be an animated film or video clip.

Figure 7:
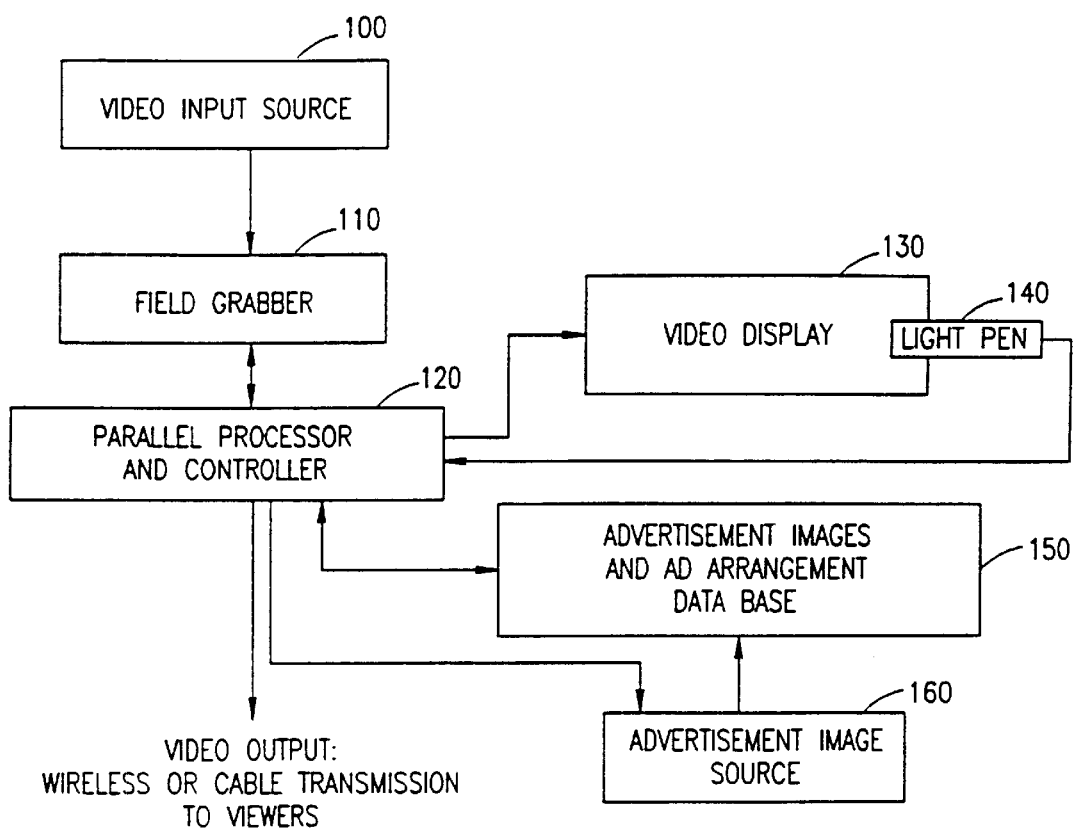
FIG. 7 is a simplified block diagram of a real time system for advertisement site detection and advertisement incorporation, constructed and operative in accordance with a preferred embodiment of the present invention.

FIG. 7 is a simplified block diagram of a real time system for advertisement site detection and advertisement incorporation, constructed and operative in accordance with a preferred embodiment of the present invention.

The apparatus of FIG. 7 includes a video input source 100, such as a video camera, video cassette, broadcast, video disk, or cable transmission, which is connected, via a suitable connector, with a field grabber 110, preferably, or alternatively with a frame grabber. Henceforth, use of the term "field grabber" is intended to include frame grabbers.

The field grabber 110 provides grabbed and digitized fields to a parallel processor and controller 120, described in more detail below with reference to FIG. 8, which is preferably associated with a video display 130 which provides an interactive indication to a user of advertisement site detection and advertisment incorporation operations of the system. Preferably a light pen 140 is associated with the video display 130.

According to an alternative embodiment of the present invention, the system receives an indication from a user of the presence in the field of view of one or more advertisements to be replaced and of the location/s thereof. The user input may, for example, be provided by means of a light pen 140. The indication provided by the user may comprise a single indication of an interior location of the advertisement, such as the approximate center of the advertisement or may comprise two or four indications of two opposite vertices or all four vertices, respectively, of an advertisement to be replaced.

Optionally, the user also provides an indication of the contents of the advertisement. For example, a menu of captions identifying advertisements to be replaced, may be provided on the video display 130 adjacent or overlaying a display of the playing field and the user can employ the light pen to identify the appropriate caption.

An advertisement images and advertisement arrangement database 150 is provided which may be stored in any suitable type of memory such as computer memory or secondary memory, such as a hard disk. The advertisement image and arrangement database 150 typically stores a plurality of advertisement images, typically still images, including images to be replaced and/or images to be incorporated into the image of the playing field, either replacing an existing advertisement or in a location not presently occupied by an advertisement.

The database 150 may also include an indication of the arrangement of a plurality of advertisements to be replaced, if the arrangement is known ahead of time. Typically, the indication of the arrangement does not include an indication of the location of each advertisement relative to the playing field, but instead includes an indication of the order in which the advertisements to be replaced will be arranged in the field. For example, a sequence of 20 side-by-side advertisements may be arranged around three sides of a playing field. The database 150 may then include an indication of the sequence in which the advertisements are arranged.

Advertisement images in the database 150 may be provided by field grabber 110 or from any suitable advertisement image source 160, such as but not limited to an image generating unit such as a image processing workstation, a scanner or other color reading device, any type of storage device, such as a hard disk, a CD ROM driver, or a communication link to any of the above.

The video output of the system may be provided via a suitable connector to suitable equipment for providing wireless or cable transmission to viewers.

Figure 8:
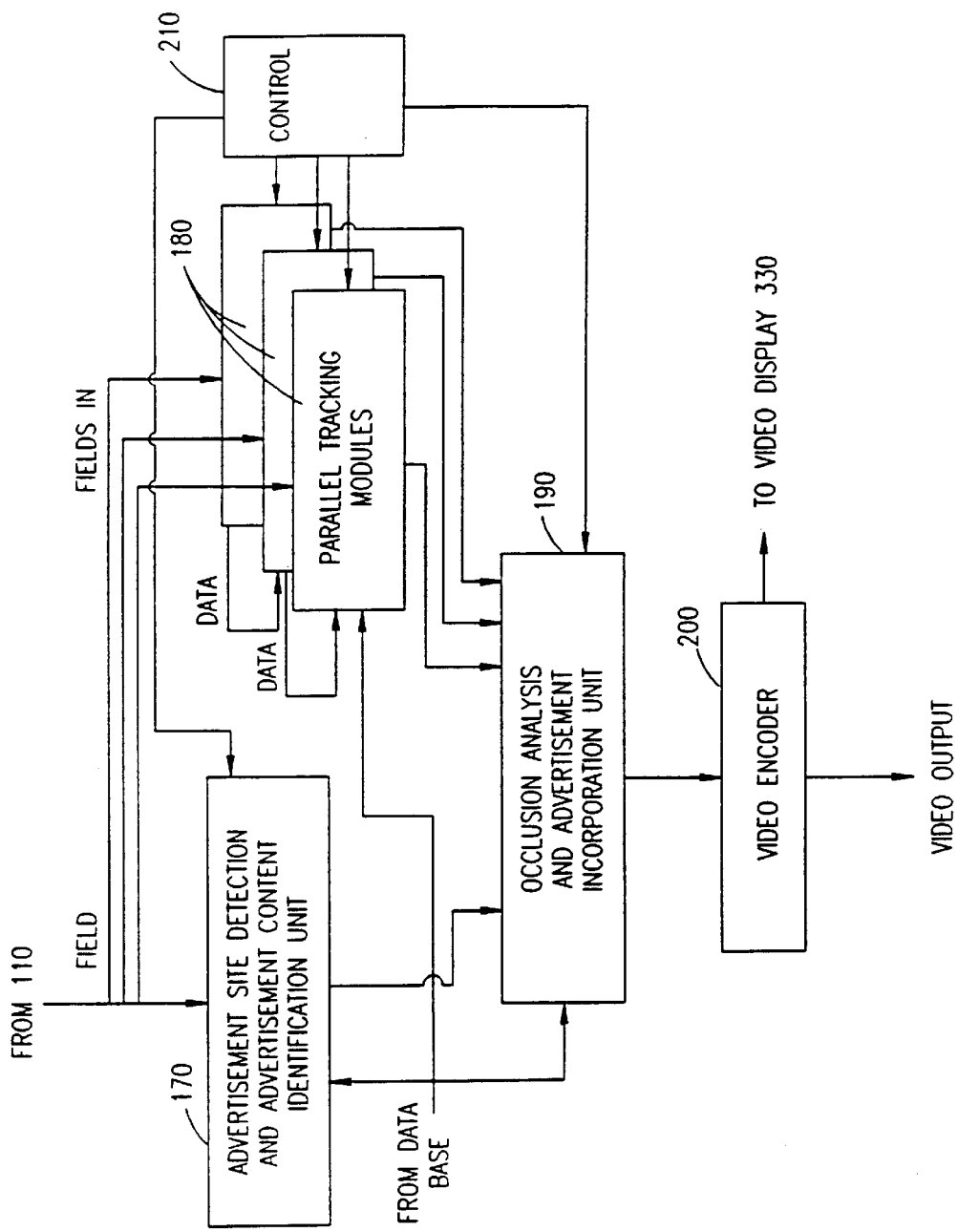
FIG. 8 is a simplified block diagram of the parallel processor and controller of FIG. 7.

FIG. 8 is a simplified block diagram of the parallel processor and controller 120 of FIG. 7. The parallel processor/controller 120 preferably includes an advertisement site detection/content identification unit 170, a plurality of parallel tracking modules 180, an occlusion analysis and advertisement incorporation unit 190, a video encoder 200 and a controller 210.

The advertisement site detection/content identification unit 170 of FIG. 8 may be implemented based on a suitable plurality of suitable image processing boards, such as Ariel Hydra boards, commercially available from Ariel, USA. Each of these preferably incorporates four TMS320C40 digital signal processors, a DRAM of 64 MB, an SRAM of 1 MB, and a VME bus interface. A specially designed coprocessor is preferably added to these boards to perform the segmentation task. The image processing boards are programmed based on the advertisement site detection and content identification methods of FIGS. 11 and 12. For example, the appropriate portions of this computer listing may be converted into Assembler and the resulting code may be loaded into the digital signal processor of the image processing board.

Each of parallel tracking modules 180 may be implemented based on one or more image processing boards, such as Ariel Hydra boards, commercially available from Ariel, USA. Each of these preferably incorporates four TMS320C40 digital signal processors, a DRAM of 64 MB, an SRAM of 1 MB, and a VME bus interface. The image processing boards are programmed for parallel operation based on the tracking method of FIG. 14. For example, the appropriate portions of the computer listing may be converted into Assembler and the resulting code may be loaded into the digital signal processor of the image processing board.

Figure 15:
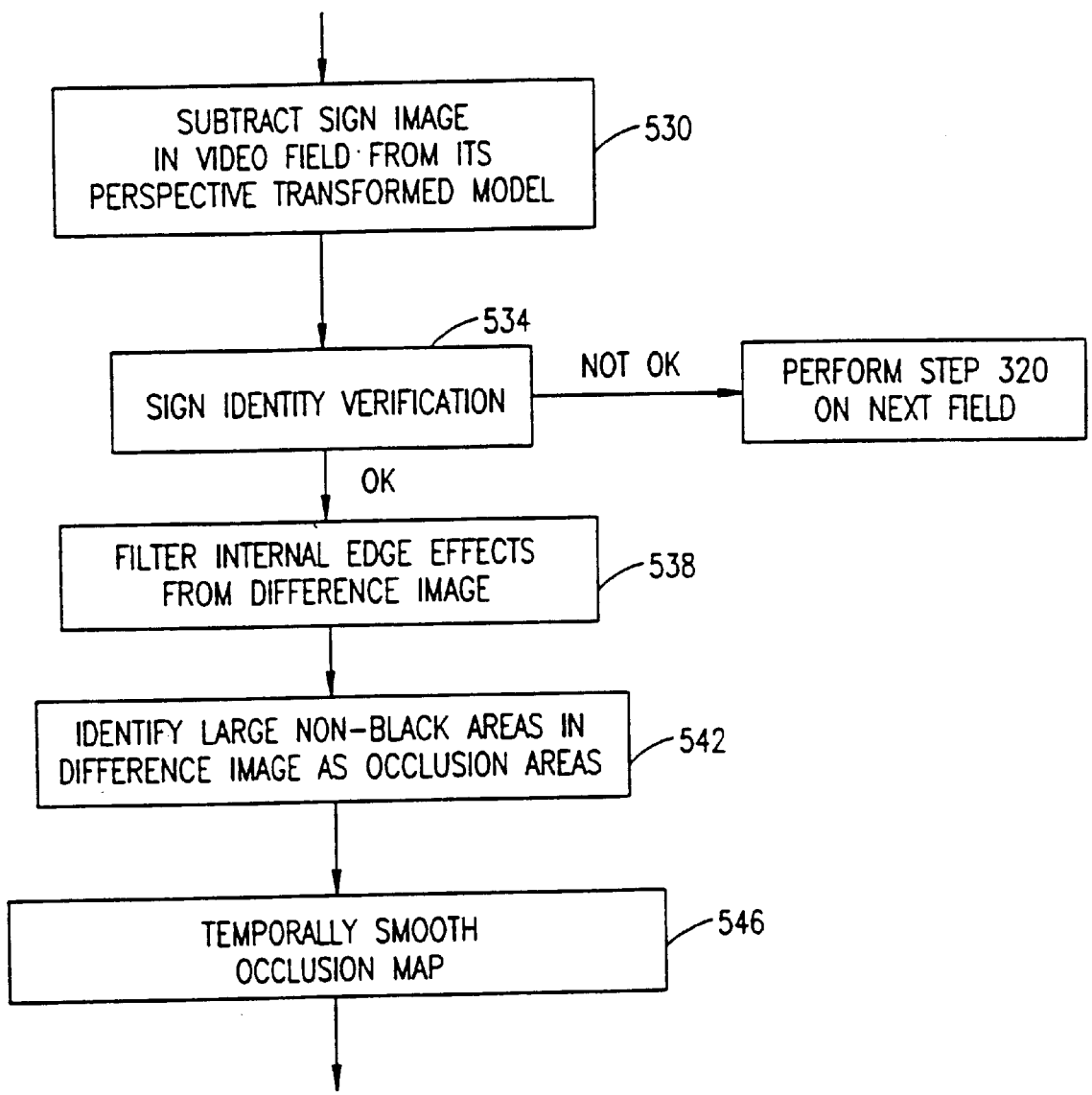
FIG. 15 is a simplified flowchart of a preferred method for performing the occlusion analysis step of FIGS. 10A and 10B.
Figure 16:
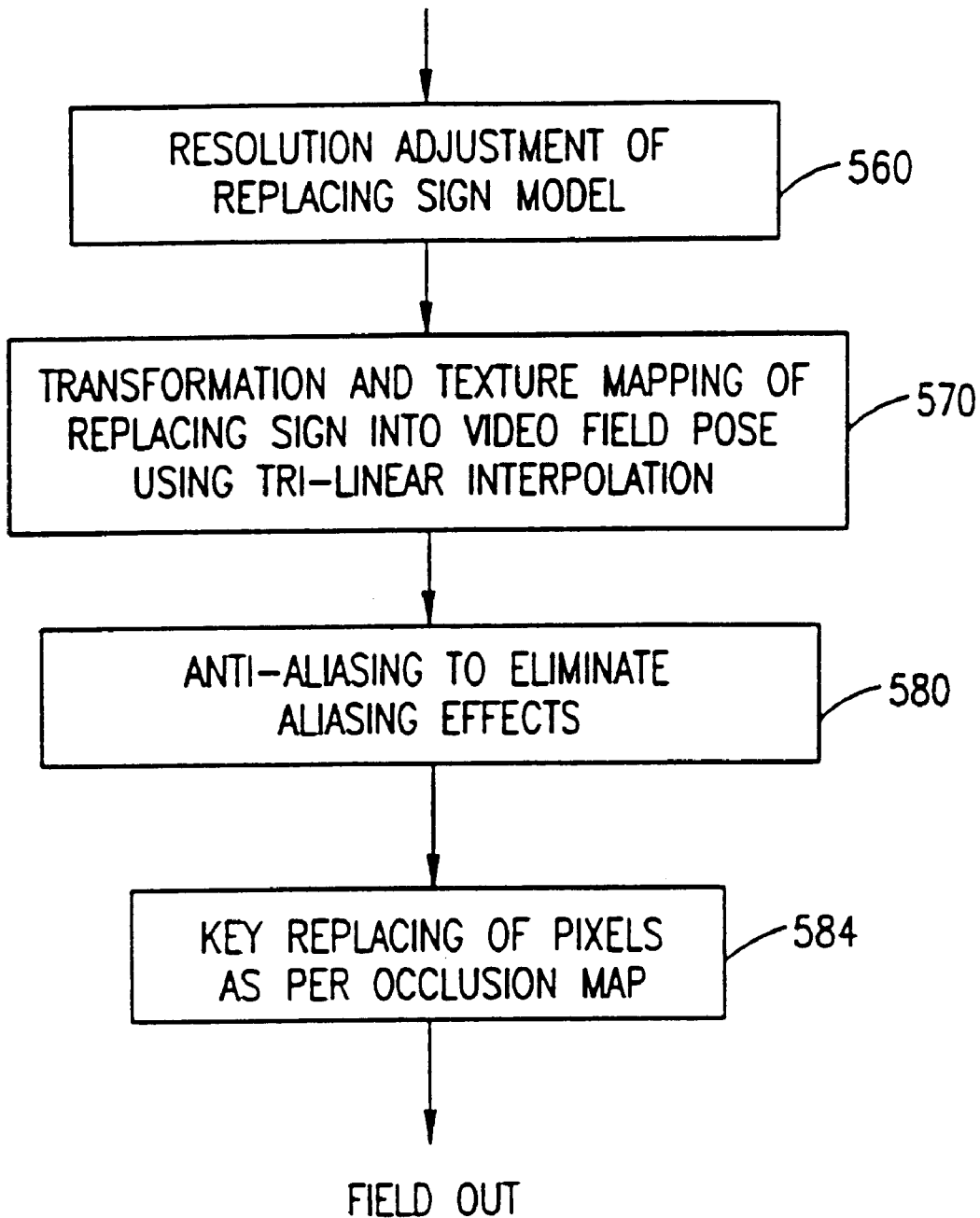
FIG. 16 is a simplified flowchart of a preferred method for performing the advertisement incorporation step of FIGS. 10A and 10B.

The occlusion analysis and advertisement incorporation unit 190 may also be based on one or more texture mapping boards such as the Fairchild's Thru-D boards with the appropriate bus bridges, programmed based on the occlusion analysis and advertisement incorporation methods of FIGS. 15 and 16. For example, the appropriate portions of the computer listing may be converted into Assembler and the resulting code may be loaded into the processor of the texture mapping board.

Video encoder 200 is operative to perform D/A conversion.

Figure 10A:
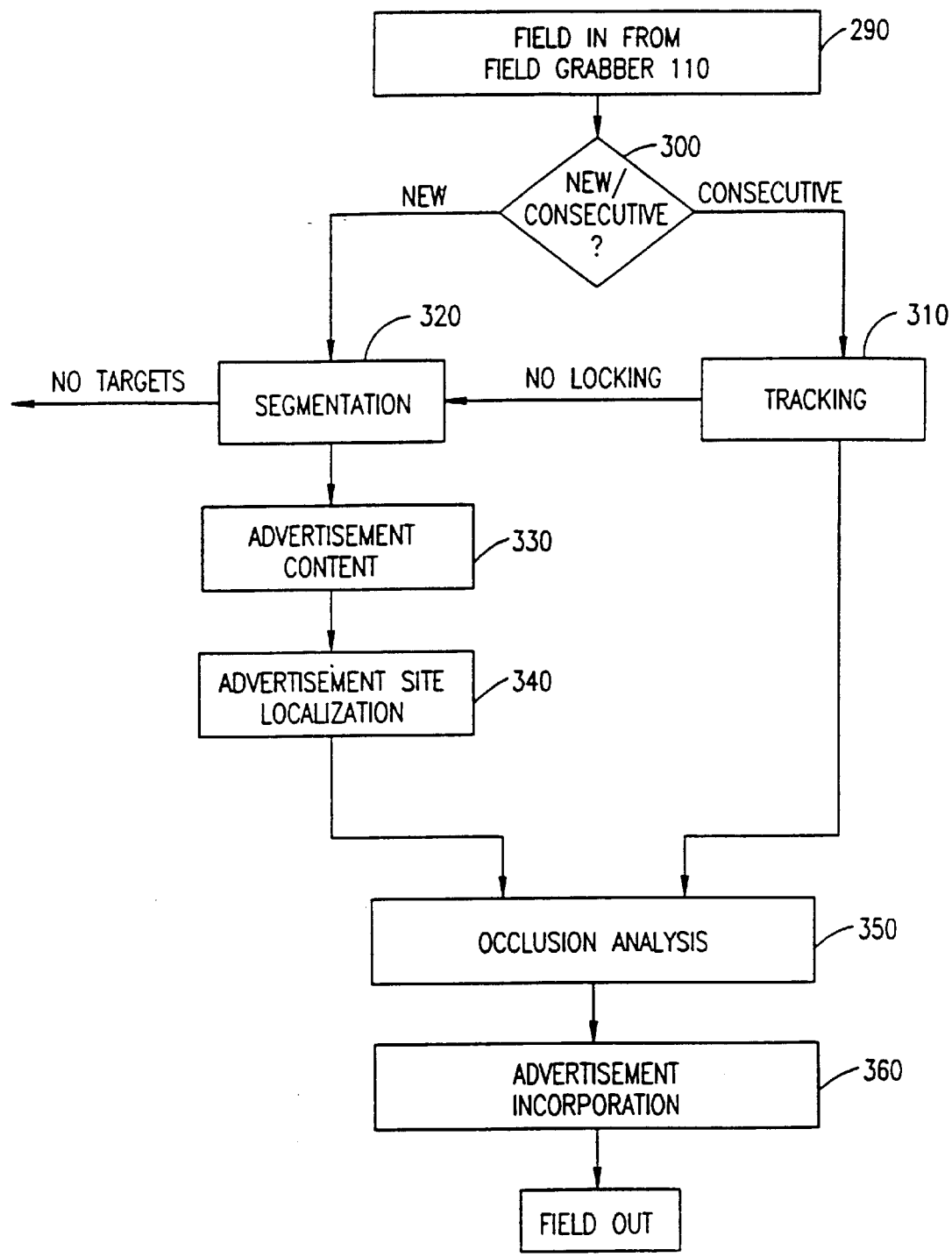
FIG. 10A is a simplified flowchart of a preferred method of operation of the parallel processor and controller of FIG. 7, when only a single advertisement site is to be identified and only a single advertisement is to be incorporated at that site.
Figure 10B:
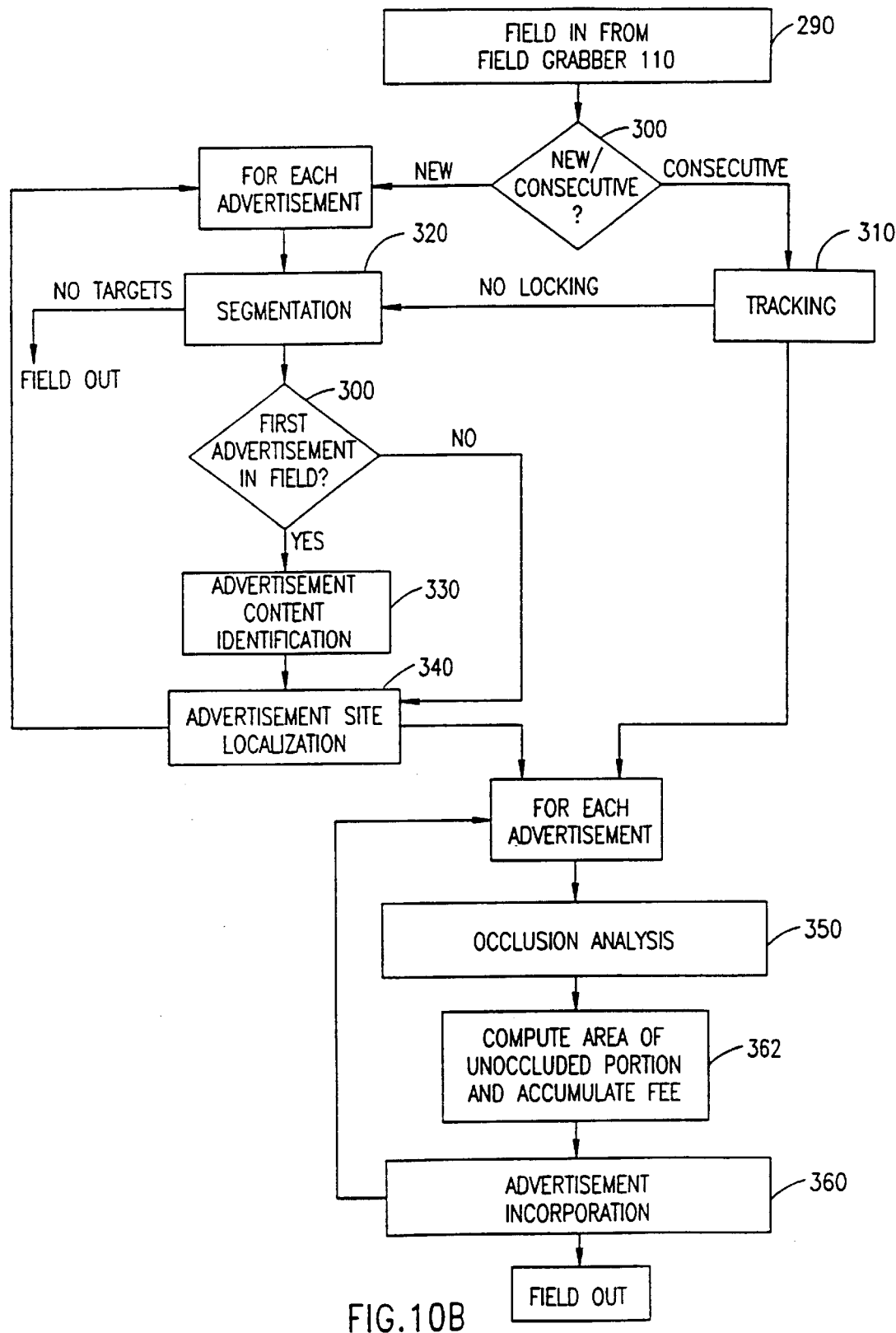
FIG. 10B is a simplified flowchart of a preferred method of operation of the parallel processor and controller of, FIG. 7, when a plurality of advertisement sites is to be identified and a corresponding plurality of advertisements, which may or may not differ in content, is to be incorporated at those sites.

Controller 210 may, for example, comprise a 486 PC programmed based on the control method of FIGS. 10A–10B. For example, the appropriate portions of the computer listing may be Intel 486 PC processor.

Figure 9:
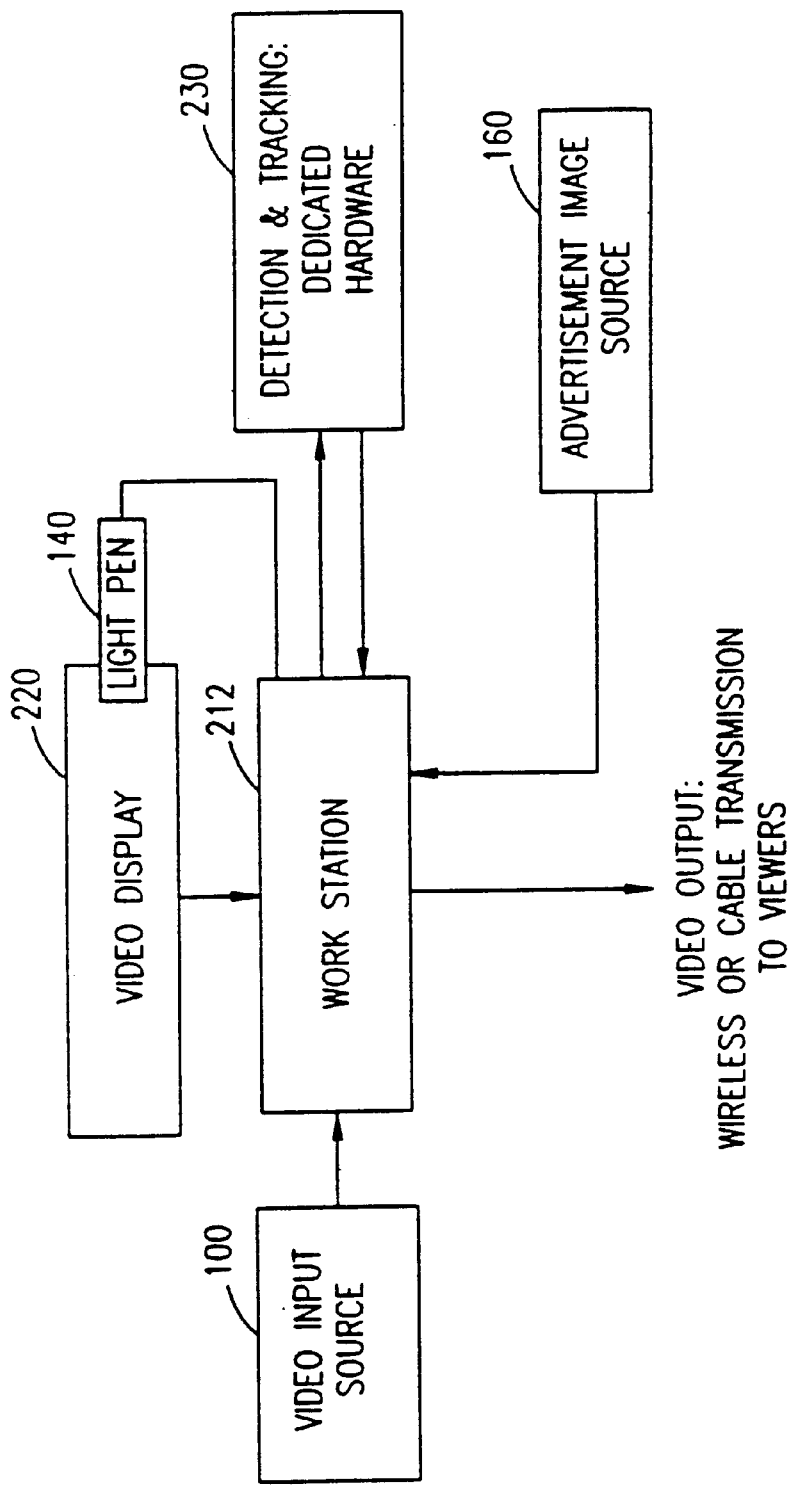
FIG. 9 is a simplified block diagram of an alternative embodiment of a real time system for advertisement site detection and advertisement incorporation.

FIG. 9 is a simplified block diagram of an alternative embodiment of a real time system for advertisement site detection and advertisement incorporation. In the apparatus of FIG. 9, a conventional workstation 212, having its own video display 220 and its own field grabber (not shown), such as a Silicon Graphics Onyx workstation loaded with a video board and a suitable software, replaces the following units of FIG. 7: field grabber 110, the parallel processor and controller 120 other than the advertisement site detection and content identification unit 170 and tracking modules 180 thereof, the video display, and the database 150.

The software for the workstation may be based on the implementation of the method of FIGS. 10A–10B, suitably converted into the workstation's environment, however some of the functions preferably omitted. Specifically:

a. The advertisement site detection and tracking functions, corresponding to the segmentation, advertisement content identification and tracking steps 320, 330 and-310 respectively of FIGS. 10A–10B are omitted and are instead implemented in real time by dedicated hardware 230 in FIG. 9; and b. The texture mapping functions (second and third steps of FIG. 16) which preferably form part of the advertisement incorporation function, are preferably omitted and are, instead, performed by the texture mapping functions provided by the workstation itself.

The dedicated hardware 230 of FIG. 9 may be similar to the advertisement site detection/content identification unit 170 and parallel tracking modules 180 of FIG. 8.

A computer listing of a non-real time software implementation of the present invention which is operative, for example, on a 486 PC in conjunction with a conventional frame grabber such as an Imaging MFG board. The method is now described with reference to FIGS. 10A–16.

FIG. 10A is a simplified flowchart of a preferred method of operation of the parallel processor and controller 120 of FIG. 7, when only a single advertisement site is to be identified and only a single advertisement image is to be incorporated at that site.

FIG. 10B is a simplified flowchart of a preferred method of operation of the parallel processor and controller 120 of FIG. 7, when a plurality of advertisement sites is to be identified and a corresponding plurality of advertisement images, which may or may not differ in content, is to be incorporated at those sites respectively.

The method of FIG. 10B typically includes the following steps, which are similar to the steps of FIG. 10A which are therefore not described separately for brevity:

STEP 290: A digitized video field is received from the field grabber 110 of FIG. 1.

STEP 300: A decision is made as to whether or not at least one advertisement in the current field was also present in the previous field (and televised by the same camera). If so, the current field is termed a "consecutive" field and the segmentation, content identification and localization steps 320, 330 and 340 preferably are replaced only by a tracking step 310. If not, the current field is termed a "new" field.

If the field is a "consecutive" field, the plurality of advertisements is tracked (step 310), based on at least one advertisement which was present in a previous field, since the present field is a "consecutive" field.

If the field is a "new" field, the advertisement site at which an advertisement is to be incorporated is identified in steps 320, 330 and 340. A loop is performed for each advertisement from among the plurality of advertisements to be processed. Preferably, the segmentation and content identification steps 320 and 330 are performed only for the first advertisement processed.

In step 320, a pair of generally parallel lines is typically detected and the image of the field is segmented. Specifically, the portion of the field located within the two detected parallel lines, which typically correspond to the top and bottom boundaries of a sequence of advertisements, is segmented from the remaining portion of the field.

Typically, the segmentation step 320 is operative to segment advertisements regardless of: their perspective relative to the imaging camera, the zoom state of the imaging camera lens, the location of the advertisement in the field of view (video field), the angular orientation of the imaging camera relative to the ground and the location of the TV camera.

The segmentation step 320 is typically operative to identify an empty or occupied advertisement site on a basis other than location, such as but not limited to any of the following, separately or in any combination:

a. Geometrical attributes of the advertisement's boundary such as substantially parallel top and bottom boundaries or such as four vertices arranged in a substantially rectangular configuration;

b. A color or a combination of colors or a color pattern, which are known in advance to be present in the advertisement image.

c. The spatial frequencies band of the advertisement image, which is typically known in advance. Typically, the known spatial frequencies band is normalized by the height of the advertisement which may, for example, be derived by computing the distance between a pair of detected horizontal lines which are known to be the top and bottom boundaries of the advertisement sequence.

In step 330, the content of the portion between the two substantially parallel lines is matched to a stored representation of an advertisement to be replaced.

Steps 320 and 330 allow advertisement sites to be identified and the content thereof to be matched to a stored model thereof, even if cuts (transitions, typically abrupt, between the outputs of a plurality of cameras which are simultaneously imaging the sports event) occur during the sports event. Typically, at each cut, steps 320 and 330 are performed so as to identify the advertisement within the first few fields of the cut. Until the next-cut occurs, the identified advertisement is typically tracked (step 310).

In step 340, the advertisement is localized at subpixel accuracy.

Finally, for each advertisement, occlusion analysis is performed (step 350) and the replacing advertisement is incorporated in the advertisement site (step 360). Alternatively, the occlusion analysis and advertisement incorporation steps are replaced by an advertisement enhancement step in which the existing advertisement is enhanced, using conventional edge sharpening techniques, rather than being replaced.

Optionally, a fee accumulation step 362 is performed, typically after occlusion analysis step 350. In the fee accumulation step, a fee for each advertisement is accumulated. The fee may be computed on any suitable basis. For example, the fee may be determined by counting the total amount of time for which the advertisement was displayed and for which at least 50% of the advertisement was unoccluded, and multiplying by a fixed dollar rate per time unit. Alternatively, the proportion of the unoccluded area of the advertisement may be computed for each time interval, such as each second. Optionally, the display time or the sum over time of the displayed area may be adjusted to take into account the game's progress. For example, the display time or the sum over time of the displayed area may be multiplied by an externally provided index indicating the tension level of the game during display of the advertisement. High tension level may, for example, mean that the game has gone into overtime or that a significant event, such as a goal, has occurred during display or just before display. Alternatively, the tension level index may be provided by the system itself. For example, a voice recognition unit may recognize significant words uttered by the sports commentator, such as the word "goal".

According to an alternative embodiment of the present invention, the segmentation and advertisement content identification steps 320 and 330 respectively may be omitted if physical landmarks identifying the locations of advertisements to be replaced whose contents is known in advance, are positioned and captured ahead of time in the playing field.

Figure 11:
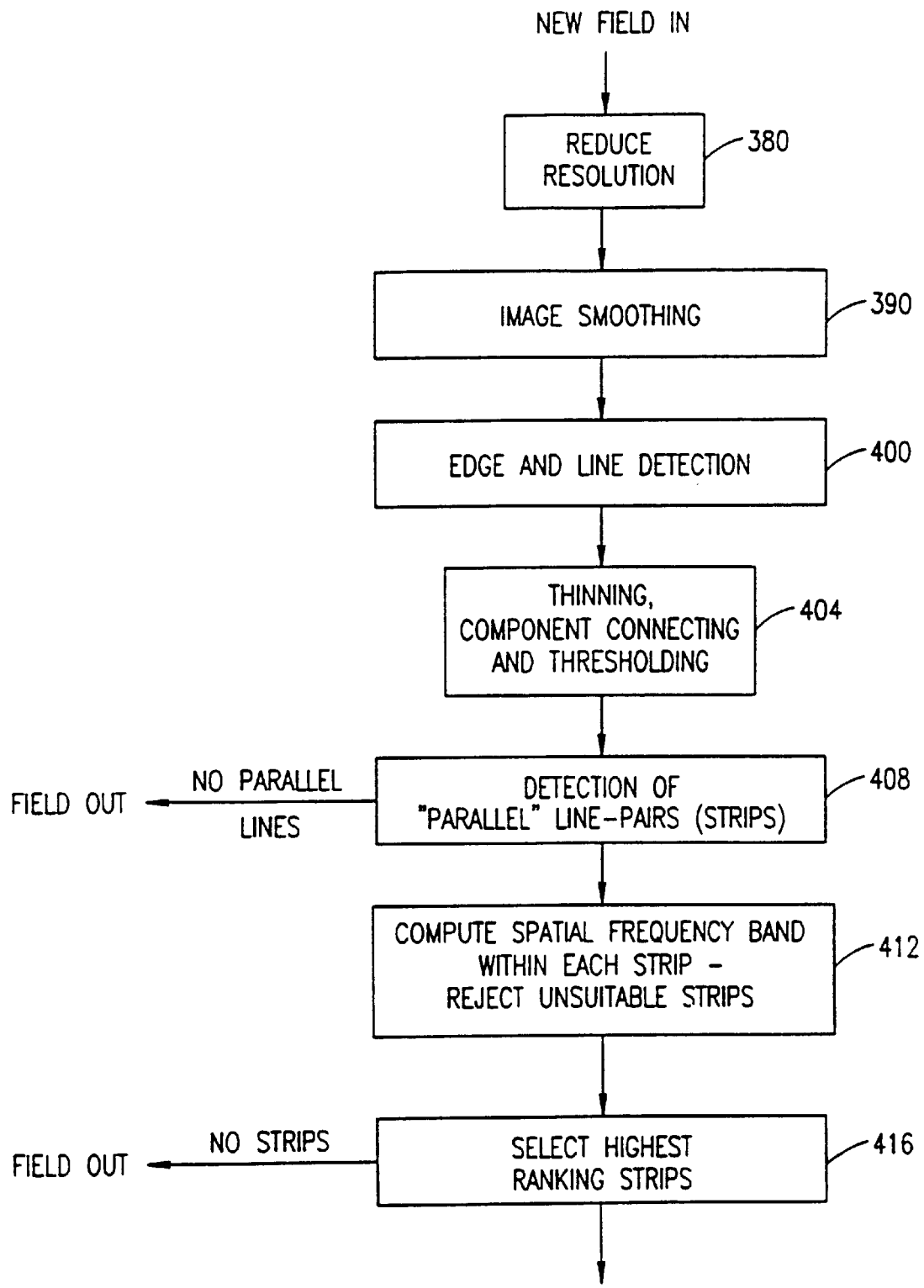
FIG. 11 is a simplified flowchart of a preferred method for performing the segmentation step of FIGS. 10A and 10B.

FIG. 11 is a simplified flowchart of a preferred method for performing the segmentation step 320 of FIGS. 10A and 10B.

The method of FIG. 11 preferably includes the following steps:

STEP 380: A new field is received and the resolution thereof is preferably reduced since the forgoing steps may be performed adequately at a lower resolution. For example, a low-pass filter may be employed to reduce a 750×500 pixel field to 128×128 pixels.

STEP 390: Optionally, the low resolution image is smoothed, e.g. by median filtering or low pass filtering, so as to remove information irrelevant to the task of searching for long or substantially horizontal lines.

STEP 400: Edges and lines (two-sided edges) are detected, using any suitable edge detection method such as the Canny method, described by J. F. Canny in "A computational approach to edge detection", IEEE Trans. Pattern Analysis and Machine Intelligence, Vol. 8, pp. 679–698, November, 1986.

STEP 404: The edges detected in step 400 are thinned and components thereof are connected using conventional techniques of connectivity analysis. The edges are thresholded so as to discard edges having too small a gradient.

STEP 408: The edges detected in steps 400 and 410 are compared pairwise so as to find strips, i.e. pairs of parallel or almost parallel lines which are relatively long. If there are no such pairs, the method terminates.

STEP 412: Find the spatial frequency spectrum within each strip and reject strips whose spatial frequency contents are incompatible with the spatial frequency band expected for advertisements. Typically, the rejection criterion is such that more than one strip, such as 3 or 4 strips, remain.

STEP 416: Rank the remaining strips and select the highest ranking strip. The rank assigned to a strip depends on the probability that the strip includes advertisements. For example, the strip in the lowest location in the upper half of the field is given higher rank than strips above it, because the strips above it are more likely to be images of portions of the stadium. The lowest located strip is more likely to be the advertisements which are typically positioned below the stadium.

Strips adjacent the bottom of the field are given low rank because the advertisements would only be imaged toward the bottom of the video field if the playing field is not being shown at all, which is unlikely.

Figure 12:
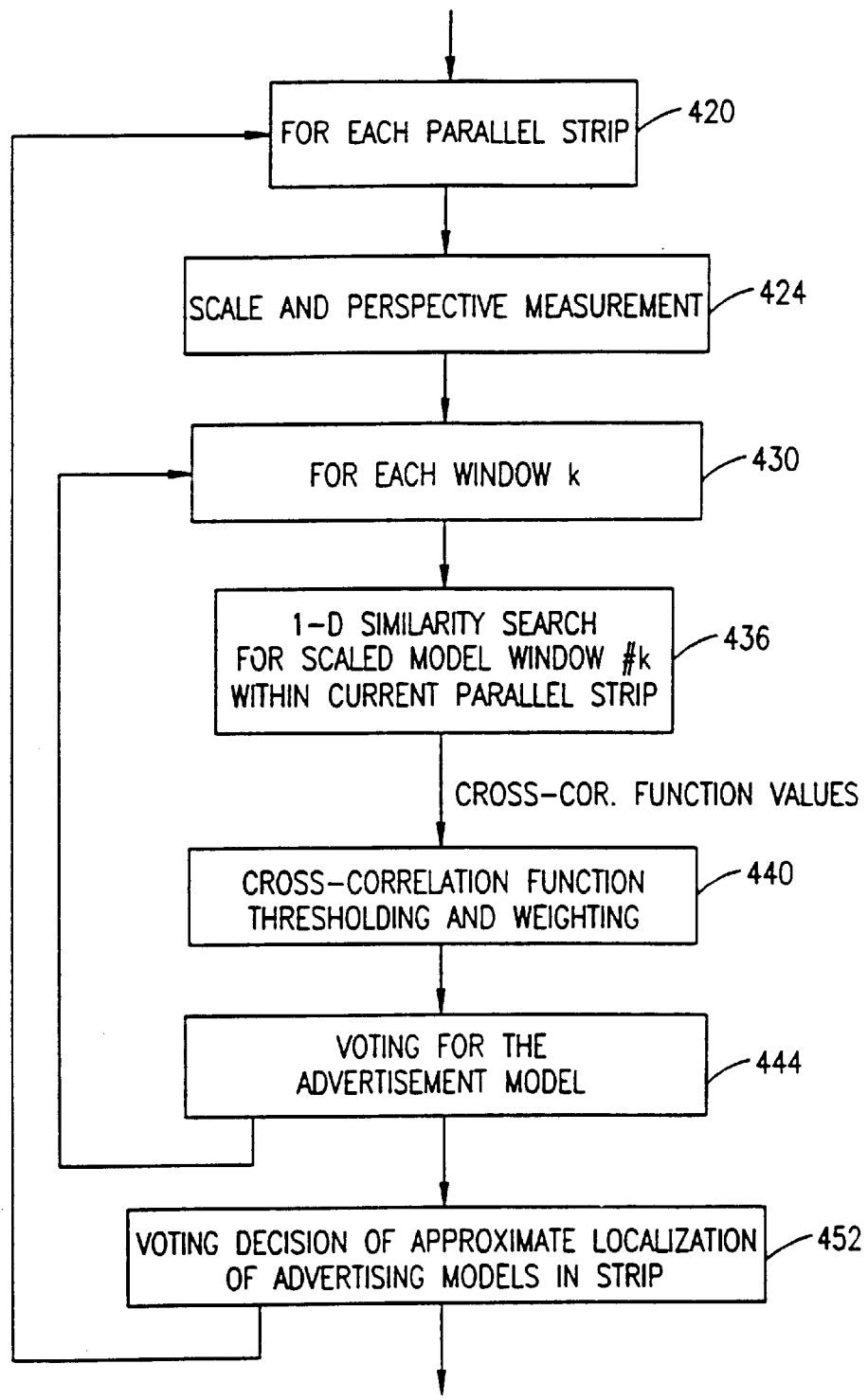
FIG. 12 is a simplified flowchart of a preferred model matching method for performing the advertisement content identification step of FIGS. 10A and 10B.

FIG. 12 is a simplified flowchart of a preferred model matching method for performing the advertisement content identification step 330 of FIGS. 10A and 10B. Alternatively, advertisement content identification may be provided by a user, as described above with reference to FIG. 1.

The method of FIG. 12 is preferably performed in low resolution, as described above with reference to step 380 of FIG. 11. The method of FIG. 12 preferably includes the following steps:

STEP 420: The forgoing steps 424, 430, 436, 440, 444 and 452 are performed for each almost parallel strip identified in segmentation step 320 of FIG. 11.

STEP 424: The distance and angle between the two lines of each strip is computed and the scale and approximate perspective at which the strip was imaged is determined therefrom.

STEP 430: During set-up, each advertisement model is divided into a plurality of windows. Steps 436, 440 and 444 are performed for each window of each advertisement model. For example, if there are 5 models each partitioned into 6 windows, this step is performed 30 times.

STEP 436: A one-dimensional similarity search is carried out for the suitably scaled current model window k, along the current almost parallel strip. Typically, a cross-correlation function may be computed for each pixel along the current strip.

STEP 440: The cross-correlation function values obtained in step 436 are thresholded. For example, values exceeding 0.6 may be assigned the value 1 (correlation) whereas values under 0.6 may be assigned the value 0 (no correlation). The 1's are weighted, depending on the "significance" of their corresponding windows. The "significance" of each window is preferably determined during set-up such that windows containing more information are more "significant" than windows containing little information.

STEP 444: At this stage, weighted thresholded cross-correlation function values have been computed which represent the results of matching the contents of each position along the strip (e.g. of each of a plurality of windows along the strip which are spaced at a distance of a single pixel) to each window of each model advertisement known to occur within the strip.

The weighted thresholded cross-correlation function values are accumulated per all windows composing a model sign or a model strip.

STEP 452: A decision is made as to the approximate location of the sequence of advertising models, within the strip. It. is appreciated that, once the location of one advertisement model has been determined, the locations of the other advertisemnt models in the same sequence are also determined, knowing the scale ad approximate perspective of the imaged strip.

Figure 13:
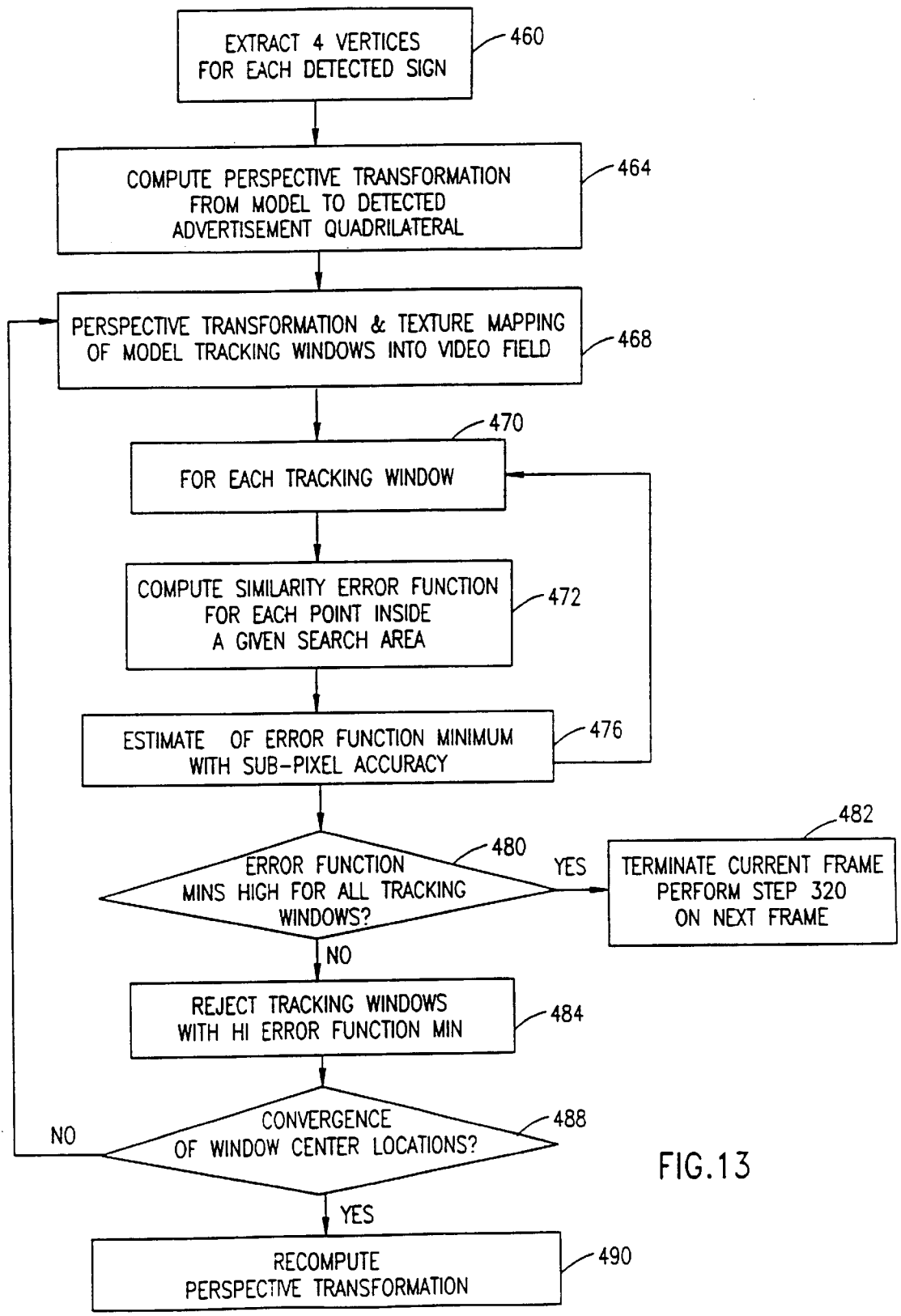
FIG. 13 is a simplified flowchart of a preferred method for performing the localization step of FIGS. 10A and 10B.

FIG. 13 is a simplified flowchart of a preferred method for performing the precise localization step 340 of FIGS. 10A and 10B. In FIG. 13, the advertisement model which was approximately localized by the method of FIG. 12, is localized with subpixel accuracy. Accurate localization is typically performed only for new fields. For "consecutive" fields, the advertisement's location is preferably measured by video tracking.

The method of FIG. 13 preferably includes the following steps:

STEP 460: From FIG. 12, the following information is available per advertisement detected: one location within the advertisement, such as one vertex thereof, the advertisement scale height in the image and its approximate perpsective. This information is employed to compute the four vertices of each detected advertisement.

STEP 464: A perspective transformation is computed which describes how to "transform" the typically rectangular model into the detected advertisement area which is typically non-rectangular due to its pose relative to the imaging camera.

STEP 468: The contents of each of a plurality of model tracking windows to which the model is divided during set up, is mapped into the video field, using the perspective transformation computed in step 464.

STEP 470: Steps 472 and 476 are performed for each of the model tracking windows.

STEP 472: The current model tracking window is translated through a search area defined in the video field. For each position of the model tracking window within the search area, a similarity error function (like cross-correlation or absolute sum of differences) is computed. Typically, the model tracking window has 8×8 or 16×16 different positions within the search area.

STEP 476: The minimum similarity error function for the current model tracking window is found. Preferably, the minimum is found at subpixel accuracy, e.g. by fitting a two-dimensional parabola to the similarity error function generated in step 472 and computing the minimum of the parabola. This minimum corresponds to the best position, at "subpixel accuracy", for the current model tracking window within the video field.

If (STEP 480) the similarity error function minima are high for all tracking windows, i.e. none of the tracking windows can be well matched to the video field, then (STEP 482) processing of the current frame is terminated and the method of FIG. 10A, from step 320 onward, is performed on the following frame.

STEP 484: Tracking windows which have a high similarity error function minimum are rejected. Typically, approximately 30 tracking windows remain.

STEP 488 is a stopping criterion determining whether or not to perform another iteration of localization by matching tracking windows. Typically, if the tracking windows' centers are found to converge, relative to the centers identified in the last iteration, the process is terminated. Otherwise, the method returns to step 464.

STEP 490: Once the tracking window locations have converged, the perspective transformation between the images advertisement and its model is recomputed.

Figure 14:
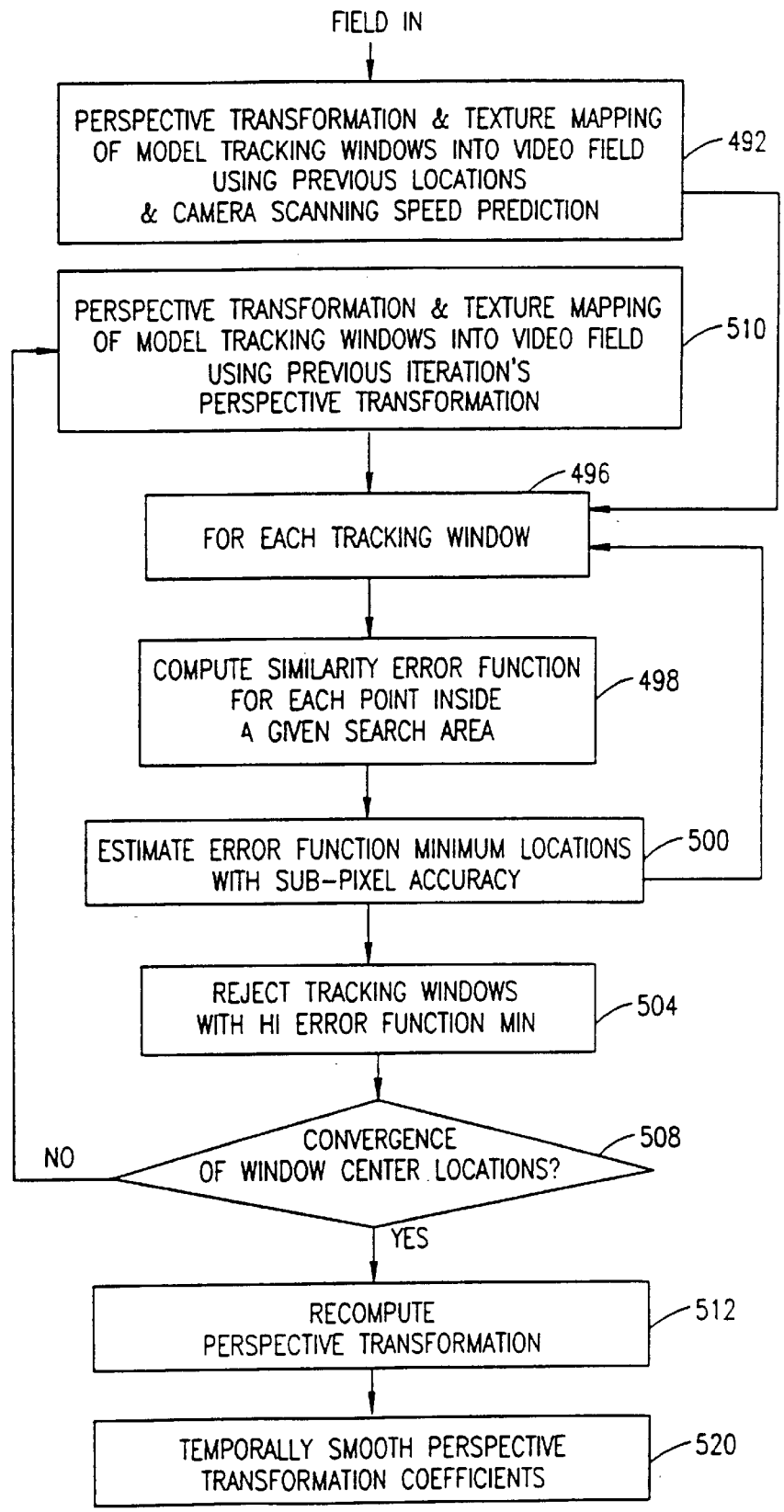
FIG. 14 is a simplified flowchart of a preferred method for performing the tracking step of FIGS. 10A and 10B.

FIG. 14 is a simplified flowchart of a preferred method for performing the tracking step 310 of FIGS. 10A and 10B. The method of FIG. 14 preferably includes the following steps:

STEP 492: A perspective transformation is performed on the model tracking windows and the contents thereof are mapped into the video field. This step employs the system's knowledge of the location of the advertisement in the previous field and, preferably, predicted scanning speed of the camera imaging the sports event.

STEP 496: Steps 498 and 500, which may be similar to steps 472 and 476, respectively, of FIG. 13, are performed for each model tracking window.

STEPS 508 AND 512 may be similar to steps 488 and 490 of FIG. 13.

STEP 510: If the window center locations do not yet converge, step 492 is redone, however, this time, the texture mapping is based upon the perspective transformation of the previous iteration.

STEP 520: The coefficients of the perspective transformation are preferably temporally smoothed, since, due to the smoothness of the camera's scanning action, it can be assumed that discontinuities are noise.

FIG. 15 is a simplified flowchart of a preferred method for performing the occlusion analysis step 350 of FIGS. 10A and 10B. The method of FIG. 15 preferably includes the following steps:

STEP 530: The advertisement image in the video field is subtracted from its perspective transformed model, as computed in step 512 of FIG. 14 or, for a new field, in step 390 of FIG. 13.

STEP 534: Preferably, the identity of the advertisement image and the stored advertisement is verified by inspecting the difference values computed in step 530. If the advertisement image and the stored advertisement are not identical, the current field is not processed any further. Instead, the next field is processed, starting from step 320 of FIG. 10B.

STEP 538: The internal edge effects are filtered out of the difference image computed in step 530 since internal edges are assumed to be artifacts.

STEP 542: Large non-black areas in the difference image are defined to be areas of occlusion.

STEP 546: The occlusion map is preferably temporally smoothed since the process of occlusion may be assumed to be continuous.

FIG. 16 is a simplified flowchart of a preferred method for performing the advertisement incorporation step 360 of FIGS. 10A and 10B. The method of FIG. 16 preferably includes the following steps:

STEP 560: The resolution of the replacing advertisement model, i.e. the advertisement in memory, is adjusted to correspond to the resolution in which the advertisement to be replaced was imaged. Typically, a single advertisement model is stored in several different resolutions.

STEP 570: The replacing advertisement is transformed and texture mapped into the video field pose, using tri-linear interpolation methods. This step typically is based on the results of step 512 of FIG. 14 or, for a new field, on the results of step 390 of FIG. 13.

STEP 580: Aliasing effects are eliminated.

STEP 590: The replacing pixels are keyed in according to an occlusion map. The values of the replacing pixels may either completely replace the existing values, or may be combined with the existing values, as by a weighted average. For example, the second alternative may be used for edge pixels whereas the first alternative may be used for middle pixels.

Figure 17:
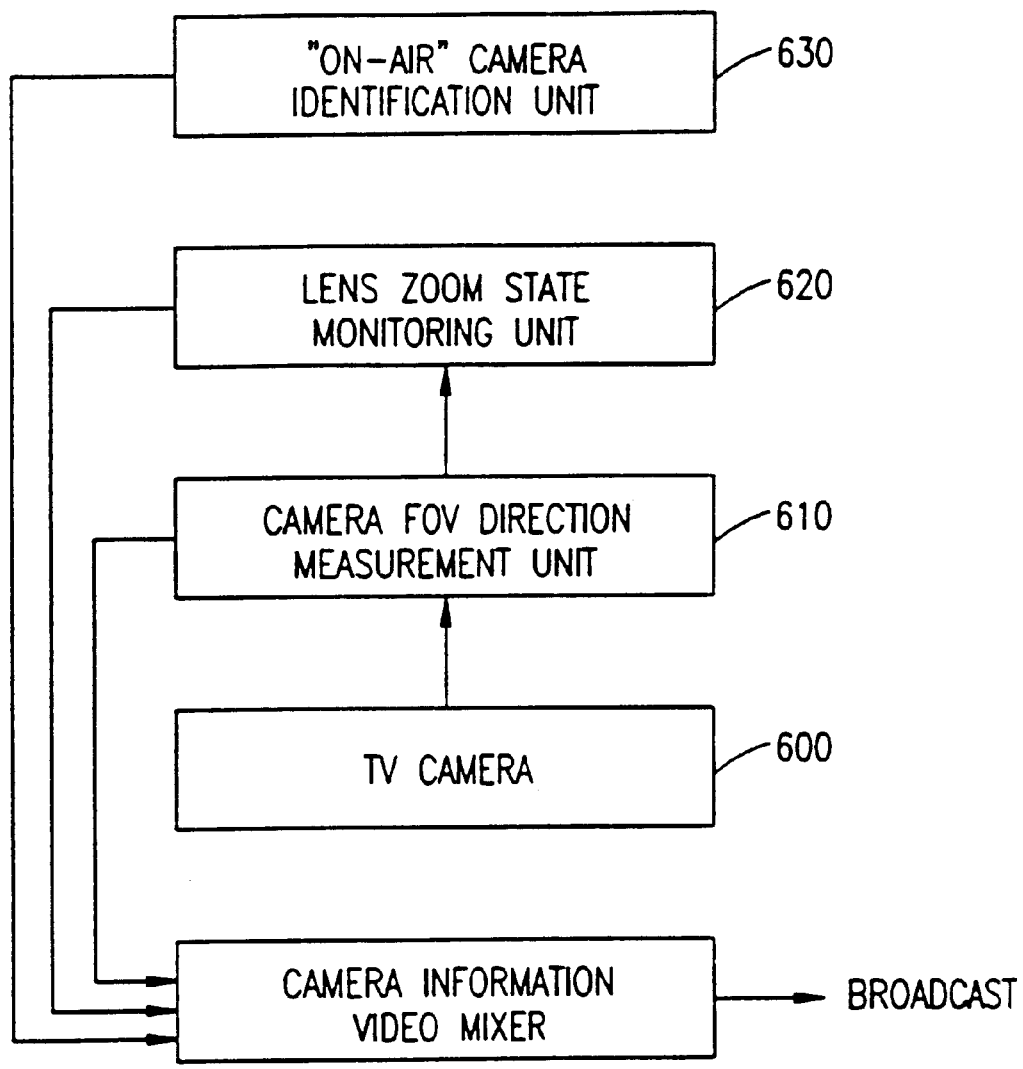
FIG. 17 is a simplified block diagram of camera monitoring apparatus useful in conjunction with the advertisement site detection/incorporation apparatus of FIG. 7.

FIG. 17 is a simplified block diagram of camera monitoring apparatus useful in conjunction with a conventional TV camera and with the advertisement site detection/incorporation apparatus of FIG. 7. If the parallel processor and controller of FIG. 7 is as illustrated in FIG. 8, the apparatus of FIG. 17 is not required and instead, a conventional TV camera may be employed. However, in the alternative, the automatic detection and content identification features of the system may be eliminated, by eliminating unit 170 of FIG. 8. In this case, the apparatus of FIG. 17 is preferably provided in operative association with the TV camera at the stadium or playing field.

The apparatus of FIG. 17 provides camera information, including the identity of the "on-air" camera, its lens zoom state and the direction of its FOV center. This information may be employed, in conjunction with known information as to the positions and contents of advertisements in the stadium, in order to detect, identify and even roughly track each advertisement.

The apparatus of FIG. 17 includes:

(a) a plurality of conventional TV cameras 600 of which one is shown in FIG. 17;

(b) for each camera 600, a camera FOV (field of view) center direction measurement unit 610 at least a portion of which is typically mounted on the TV camera 600 pedestal;

(c) for each camera 600, a camera lens zoom state monitoring unit 620 which is typically mounted on the TV camera 600 pedestal. The monitoring unit 620 receivse an output indication of the zoom state directly from the zoom mechanism of the camera;

(d) an "on-air" camera identification unit 630 operative to identify the camera, from among the plurality of TV cameras 600, which is being broadcast. This information is typically available from the broadcasting system control unit which typically receives manual input selecting an on-air camera, from a producer; and (e) a camera information video mixer 640 operative to mix the output of units 610, 620 and 630 onto the broadcast. Any suitable mixing may be employed, such as mixing onto the audio channel, mixing onto the time code, or mixing onto the video signal itself.

The camera FOV direction measurement unit 610 may be implemented using any of the following methods, inter alia:

a. On-camera NFM (North Finding Module) in conjunction with two inclinometers for measuring the two components of the local gravity vector angle with respect to the FOV center direction;

b. GPS—(Global Position System) based direction measurement system;

c. Triangulation—positioning two RF sources at two known locations in the playing field or stadium and an RF receiver on the camera;

d. an on-camera boresighted laser designator in combination with an off-camera position sensing detector operative to measure the direction of the beam spot generated by the lasr designator.

Figure 18:
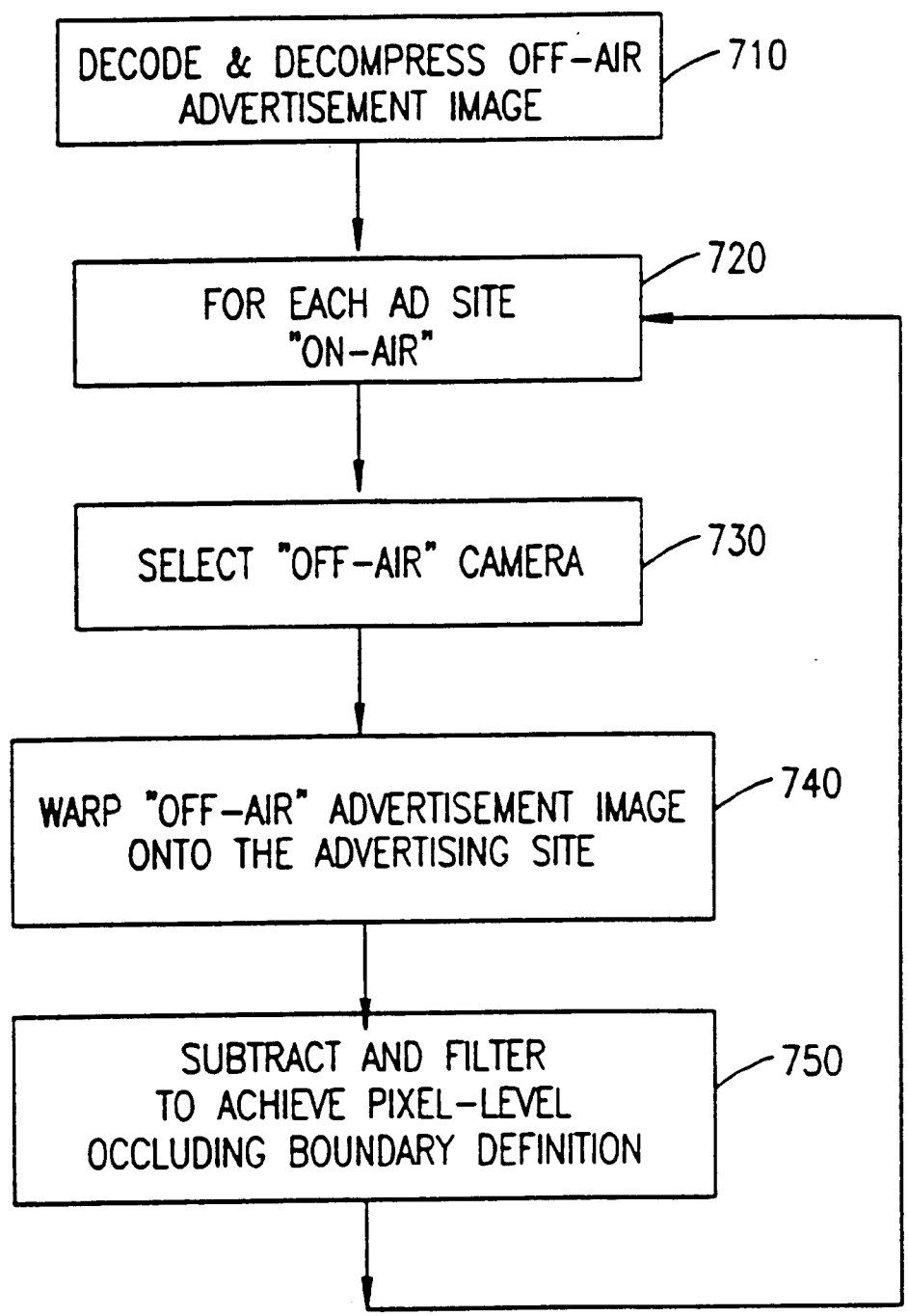
FIG. 18 is a simplified flowchart of a preferred method for processing the output of the occlusion analysis process of FIG. 15 in order to take into account images from at least one off-air camera.

FIG. 18 is a simplified flowchart of an optional method for processing the output of the occlusion analysis process of FIG. 15 in order to take into account images from at least one off-air camera. If the method of FIG. 18 is employed, a video compressor and mixer 700 are provided in operative association with the TV cameras which are imaging the event at the playing field or stadium, as shown in FIG. 2. The output of the compressor and mixer 700, comprising compressed images of the playing field as imaged by all of the TV cameras other than the TV camera which is "on-air", blended with the broadcast signal, is broadcast to remote advertisement site detection/incorporation systems such as that illustrated in FIG. 7. The transmission provided by compressor and mixer 700 of FIG. 2 is first decoded and decompressed in step 710 of FIG. 18.

STEP 720: Steps 730, 740 and 750 are repeated for each advertisement site imaged by the "on air" camera.

STEP 730: Although it is possible to employ information from more than one of the "off-air" cameras, preferably, only a single "off air" camera is employed to process each advertisement site and the single "off-air" camera is selected in step 730. For example, if the apparatus of FIG. 17 is provided, the output of camera FOV direction measurement unit 610 for each "off-air" camera may be compared in order to identify the "off-air" camera whose FOV direction is maximally different from the FOV direction of the "on-air" camera. Alternatively, particularly if the apparatus of FIG. 17 is omitted, a single "off-air" camera may be selected by performing preliminary analysis on the images generated by each of the "off-air" cameras in order to select the most helpful "off-air" camera. For example, the images generated by each "off-air" camera may be matched to the stored representation of the advertisement currently being processed. Then, the actual image may be warped and then subtracted from the stored representation for each "off-air" camera in order to obtain an estimate of the occlusion area for that camera and that advertisement. The camera with the minimal occlusion area may then be selected.

STEP 740: The advertisement image of the selected "off-air" camera is warped onto the advertisement site as imaged by the "on-air" camera.

STEP 750: The warped "off-air" advertisement image is subtracted from the "on-air" image and the difference image is filtered in order to compute the boundary of the occluding object at pixel-level accuracy.

According to a preferred embodiment of the present invention, the advertisement to be incorporated in a particular location in the playing field or other locale may vary over time. This variation may be in accordance with a predetermined schedule, or in accordance with an external input. For example, a speech recognition unit may be provided which is operative to recognize key words, such as the word "goal" or the word "overtime", on the audio channel accompanying the video input to the system.. In this way, an advertisement may be scheduled to be incorporated at particular times, such as just after a goal or during overtime.

In the present specification, the term "advertisement site" refers to a location into which an advertisement is to be incorporated. If an existing advertisement occupies the advertisement site, the new advertisement replaces the existing advertisement. However, the advertisement site need not be occupied by an existing advertisement. The term "occluded" refers to an advertisement site which is partially or completely concealed by an object, typically a moving object, in front of it.

A particular feature of the present invention is that, when it is desired to track an advertisement site within a larger image, the entire image is not tracked, but rather only the advertisement site itself.

Another particular feature is that "special" advertisements may be provided, such as moving, blinking or otherwise varying advertisements, video film advertisements, advertisements with changing backgrounds, and advertisements with digital effects.

It is appreciated that the particular embodiment described is intended only to provide an extremely detailed disclosure of the present invention and is not intended to be limiting.

Figure 19:
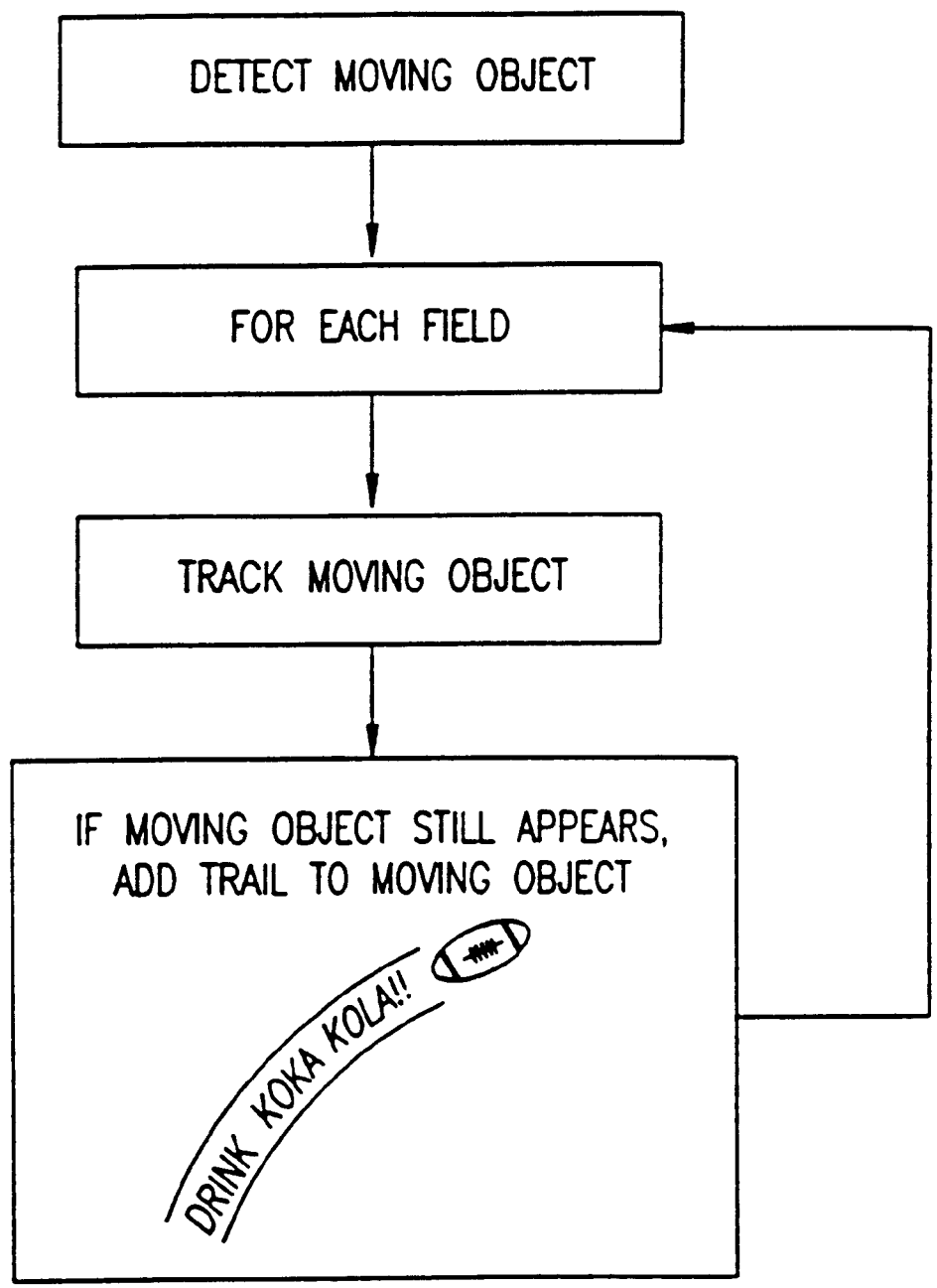
FIG. 19 is a simplified flowchart of a preferred method for detecting and tracking moving objects of central interest.

The applicability of the apparatus and methods described above is not limited to the detection, tracking and replacement or enhancement of advertisements. The disclosed apparatus and methods may, for example, be used to detect and track roving objects of central interest, as shown in FIG. 19, such as focal athletes and such as balls, rackets, clubs and other sports equipment. The images of these moving objects may then be modified by adding a "trail" including an advertisement such as the logo of a manufacturer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by those skilled in the art that. the invention is not limited to what has been shown and described hereinabove. Rather, the scope of the invention is defined solely by the claims which follow:

What is claimed is:

1. Apparatus for advertisement image detection comprising:

a T.V. camera array comprising at least one camera for generating images of a game to be broadcast, a field grabber operative to grab and digitize at least one field representing at least a portion of a sports facility viewed by said at least one T.V. camera, an advertisement image detector operative to detect at least one advertisement image in at least one field; and an advertisement exposure time counter operative to automatically count the length of an exposure time period of each advertisement image, said time counter also being operative to store at least one characteristic of the exposure time period of each advertisement image other than its length, the apparatus also comprising an advertisement fee computer operative to compute an advertisement fee according to the length of the exposure time period and said at least one other characteristic of the exposure time period.

2. Apparatus according to claim 1, wherein the characteristic of the exposure time period other than the length thereof includes an indication of whether or not the exposure time period took place during an overtime period of said game.

3. Apparatus according to claim 1, wherein the characteristic of the exposure time period other than the length thereof includes an indication of the interval between each exposure and the beginning of the game.

4. Apparatus as claimed in claim 3, wherein the characteristic of the exposure period other than its length comprises means for computing the area of an unoccluded portion of said advertisement.

5. Apparatus as claimed in claim 4, in which the unoccluded area of the portion of said advertisement must be less than 50% of the total area of the advertisement for the exposure time to be counted.

* * * * *